United States Patent
Fudemoto et al.

(10) Patent No.: US 10,450,443 B2
(45) Date of Patent: Oct. 22, 2019

(54) TIRE

(71) Applicant: BRIDGESTONE CORPORATION, Chuo-ku, Tokyo (JP)

(72) Inventors: Hiroyuki Fudemoto, Kodaira (JP); Takashi Harada, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 864 days.

(21) Appl. No.: 14/381,689

(22) PCT Filed: Feb. 27, 2013

(86) PCT No.: PCT/JP2013/055236
§ 371 (c)(1),
(2) Date: Aug. 28, 2014

(87) PCT Pub. No.: WO2013/129524
PCT Pub. Date: Sep. 6, 2013

(65) Prior Publication Data
US 2015/0059956 A1    Mar. 5, 2015

(30) Foreign Application Priority Data
Feb. 29, 2012    (JP) .................................. 2012-044646

(51) Int. Cl.
*B60C 5/01*    (2006.01)
*B60C 1/00*    (2006.01)
(Continued)

(52) U.S. Cl.
CPC .............. *C08K 7/14* (2013.01); *B60C 1/0041* (2013.01); *B60C 5/007* (2013.01); *B60C 5/01* (2013.01); *B60C 9/12* (2013.01); *C08G 69/40* (2013.01); *C08K 7/02* (2013.01); *C08K 7/06* (2013.01); *C08L 67/00* (2013.01); *C08L 67/025* (2013.01); *C08L 77/00* (2013.01); *C08L 77/12* (2013.01); *B60C 2011/145* (2013.01); *C08L 2205/025* (2013.01); *C08L 2205/16* (2013.01);
(Continued)

(58) Field of Classification Search
CPC .. B60C 5/01; B60C 5/007; B60C 9/12; B60C 9/13; B29D 30/0678; B29D 30/0679; Y10T 152/10513; Y10T 428/2904; Y10T 428/2969; Y10T 428/298; C08K 7/02; C08J 5/046
USPC .................. 152/452, 458; 428/359, 395, 401
See application file for complete search history.

(56) References Cited

U.S. PATENT DOCUMENTS 2,797,469 A * 7/1957 Kahn ..................... B60C 9/0028
3,472,715 A * 10/1969 Weinbrenner ................ 152/452
(Continued)

FOREIGN PATENT DOCUMENTS

EP    0 098 459 A  *  1/1984
GB    1166846    * 10/1969
(Continued)

OTHER PUBLICATIONS

English machine translation of EP 98459 A, Jan. 18, 1984.*
(Continued)

*Primary Examiner* — Adrienne C. Johnstone
(74) *Attorney, Agent, or Firm* — Sughrue Mion, PLLC

(57) ABSTRACT

A tire including a circular tire frame formed of a resin material that includes a thermoplastic resin and fibers.

4 Claims, 7 Drawing Sheets

(51) Int. Cl.
- *C08K 7/02* (2006.01)
- *C08K 7/14* (2006.01)
- *C08K 7/06* (2006.01)
- *C08L 67/00* (2006.01)
- *C08L 77/00* (2006.01)
- *B60C 9/12* (2006.01)
- *C08L 67/02* (2006.01)
- *C08G 69/40* (2006.01)
- *C08L 77/12* (2006.01)
- *B60C 5/00* (2006.01)
- *B60C 11/14* (2006.01)

(52) U.S. Cl.
CPC ... *C08L 2207/04* (2013.01); *Y10T 152/10513* (2015.01); *Y10T 428/2904* (2015.01); *Y10T 428/298* (2015.01); *Y10T 428/2969* (2015.01)

(56) References Cited

U.S. PATENT DOCUMENTS

| | | | | |
|---|---|---|---|---|
| 3,514,318 A | * | 5/1970 | Janetos | B60C 9/0028 |
| 3,709,845 A | * | 1/1973 | Boustany et al. | |
| 3,888,291 A | * | 6/1975 | Herzlich | 152/452 X |
| 3,977,453 A | | 8/1976 | Coran et al. | |
| 5,513,683 A | * | 5/1996 | Causa | B60C 1/00 |
| | | | | 152/458 X |
| 5,576,104 A | * | 11/1996 | Causa | B60C 1/0016 |
| | | | | 152/458 X |
| 2013/0206301 A1 | | 8/2013 | Fudemoto et al. | |
| 2016/0303905 A1 | | 10/2016 | Fudemoto et al. | |

FOREIGN PATENT DOCUMENTS

| | | |
|---|---|---|
| JP | 3-143701 A | 6/1991 |
| JP | 2003-104005 A | 4/2003 |
| JP | 2003-104006 A | 4/2003 |
| JP | 2003-104008 A | 4/2003 |
| WO | 2012026547 A1 | 3/2012 |

OTHER PUBLICATIONS

Communication dated Nov. 17, 2015 from the European Patent Office in counterpart application No. 13754742.8.
International Search Report for PCT/JP2013/055236 dated May 21, 2013.

* cited by examiner

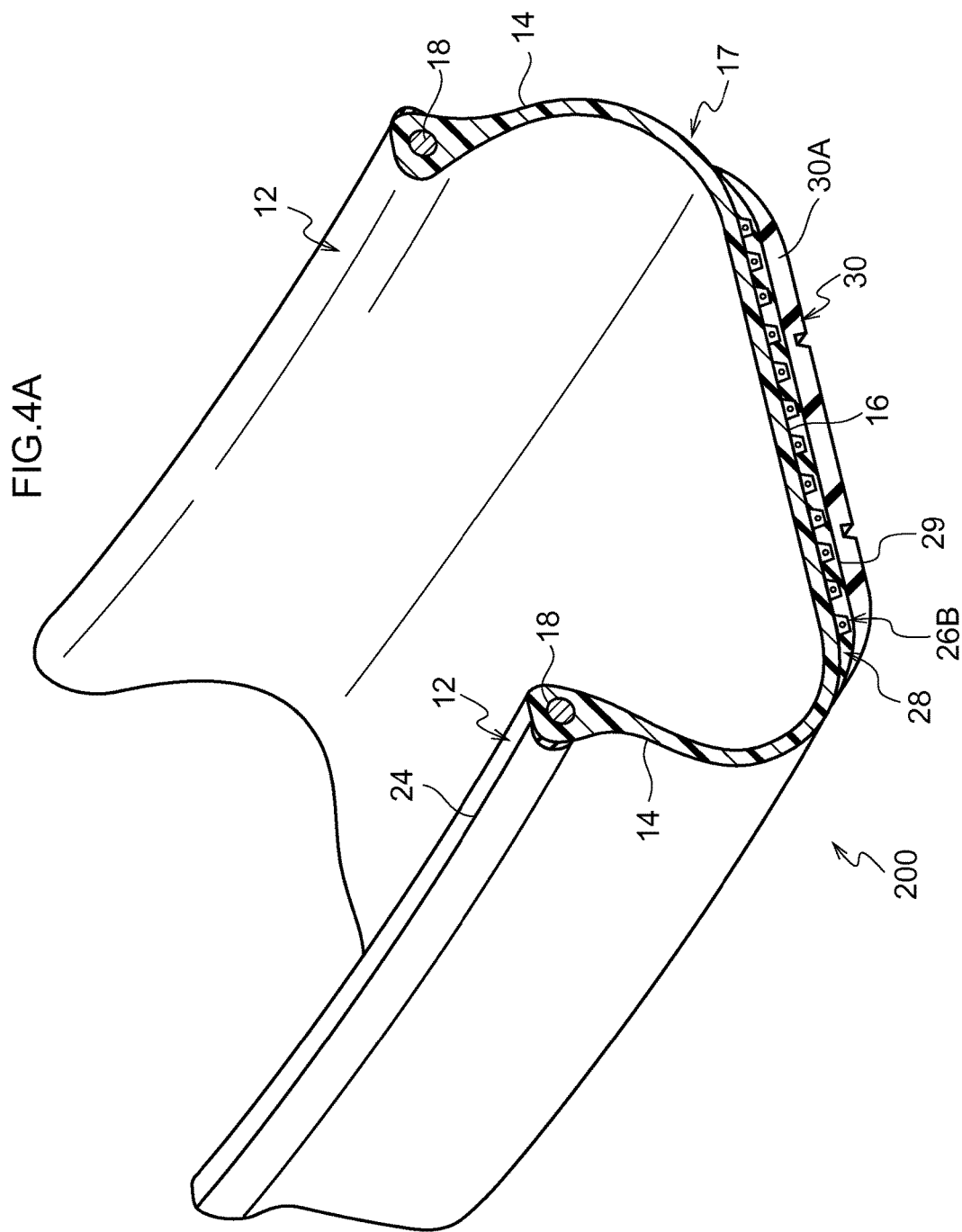

TIRE

CROSS REFERENCE TO RELATED APPLICATIONS

This application is a National Stage of International Application No. PCT/JP2013/055236 filed Feb. 27, 2013, claiming priority based on Japanese Patent Application No. 2012-044646 filed Feb. 29, 2012, the contents of all of which are incorporated herein by reference in their entirety.

TECHNICAL FIELD

The present invention relates to a tire for fitting onto a rim and, in particular, relates to a tire in which at least a portion is formed of a resin material.

BACKGROUND ART

Conventionally, pneumatic tires configured from rubber, organic fiber materials, steel members, and the like, have been employed in vehicles such as cars.

Recently, the use of resin materials, in particular thermoplastic resins, thermoplastic elastomers, and the like, as tire materials is being investigated from the perspectives of weight reduction, ease of molding, and ease of recycling.

For example, Japanese Patent Application Laid-Open (JP-A) No. 2003-104008, and JP-A No. H03-143701 describe a pneumatic tire formed using a thermoplastic polymer material.

SUMMARY OF INVENTION

Technical Problem

A tire in which a polymer material with thermoplastic properties is used is more easily manufactured and lower in cost than a conventional rubber-made tire. However, in cases in which a tire frame is formed with a uniform thermoplastic polymer material in which a reinforcing member, such as a carcass ply or the like, is not incorporated, there is still room for improvement in terms, for example, of withstanding stress, withstanding internal pressure, and the like, compared to a conventional rubber-made tire.

There is demand to achieve performance that compares favorably to conventional rubber-made tires, while also achieving increased manufacturing efficiency and low cost when manufacturing tires using a thermoplastic polymer material.

The use of a thermoplastic resin such as a thermoplastic elastomer may be proposed as a thermoplastic polymer material with an elastic force similar to that of a conventional rubber-made tire. However, there is a tendency for thermoplastic elastomers to have a low elastic modulus, requiring an increase in the hard segment amount in order to raise the elastic modulus. However, although increasing the hard segment amount of a thermoplastic elastomer improves the pressure withstanding ability arising from the elastic modulus, there is sometimes a drop in low-temperature performance.

In consideration of the above circumstances, an object of the invention is to provide a tire formed using a resin material that has excellent durability.

Solution to Problem

A tire of the invention has a circular tire frame formed of a resin material including a thermoplastic resin and fibers, wherein the content of the fibers in the resin material is from 1% by mass to 10% by mass with respect to the total mass of the resin material, and the fibers have a length (L) of from 5 mm to 10 mm and a diameter (D) of from 7 μm to 30 μm;

wherein the tire is a pneumatic tire and the tire frame has a pair of bead portions removably contacting a pair of bead seats and a pair of rim flanges when the tire is fitted to a wheel rim, a pair of side portions respectively extending radially outwardly from the bead portions, and a crown portion connecting together the radially outer ends of the pair of side portions, and wherein the fibers are aliphatic polyamide fibers.

BRIEF DESCRIPTION OF DRAWINGS

FIG. 4A is a cross-section taken along the tire width direction of a tire of an embodiment of the invention.

DESCRIPTION OF EMBODIMENTS

Figure 1A:
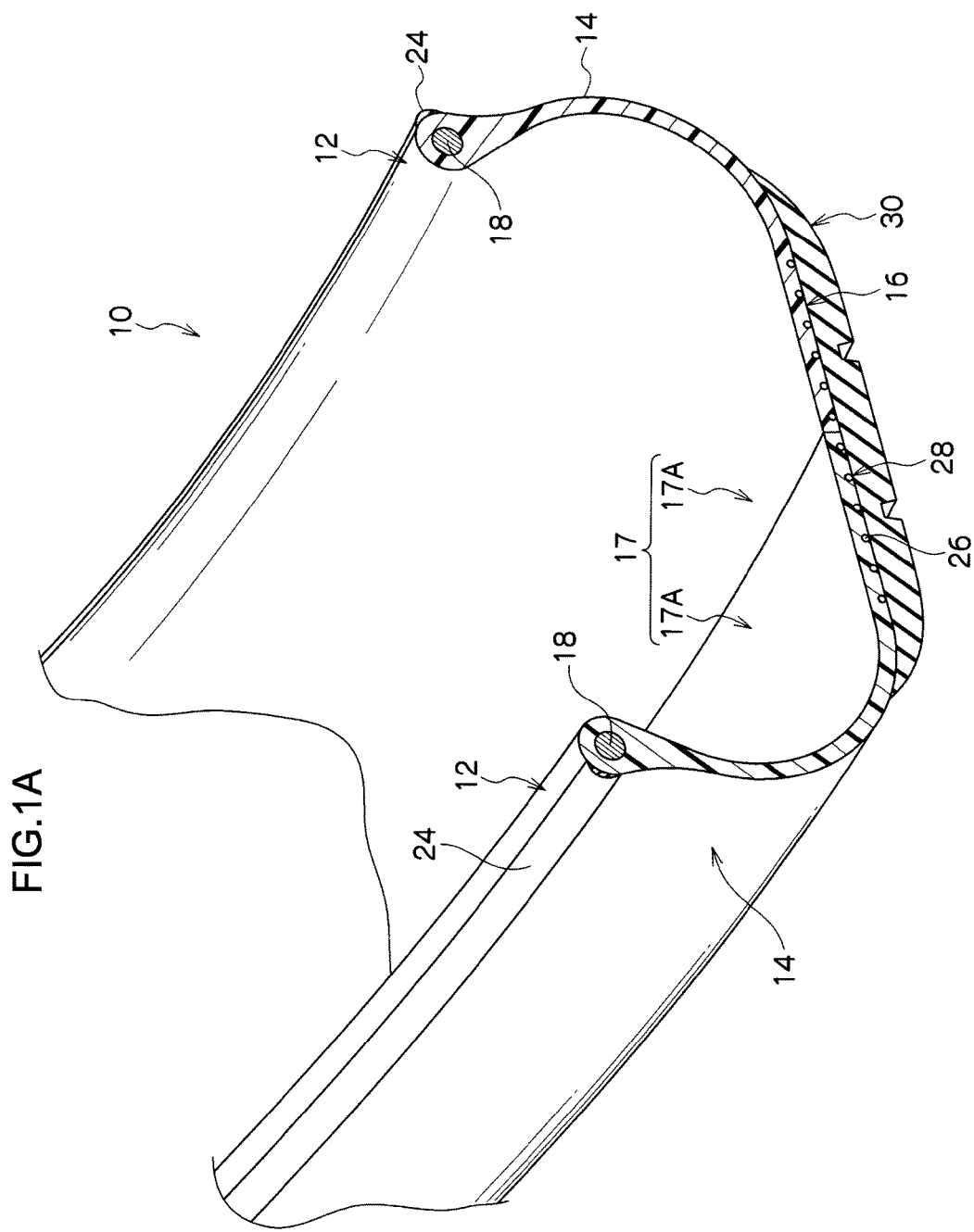
FIG. 1A is a perspective view illustrating a cross-section of a portion of a tire according to an embodiment of the invention.

The tire of the invention includes a circular tire frame formed of a resin material that includes a thermoplastic resin and fibers.

In the invention, "resin material" refers to a material that at least contains a resin, and may also further include components other than resin. The resin material is constituted entirely of resin in cases in which the resin material does not include components other than resin.

In the present specification, the concept of "resin" includes thermoplastic resins, and thermosetting resins, but does not include natural rubber. Moreover, thermoplastic elastomers are included in the scope of thermoplastic resins.

In the tire of the invention, the resin material constituting the tire frame includes at least a thermoplastic resin and fibers, thereby increasing the strength of the tire frame and enabling a tire of excellent durability to be achieved.

Moreover, since the tire is formed of a resin material, the need for a vulcanization process, that was an essential process for a conventional rubber-made tire, is obviated, enabling, for example, the tire frame to be formed by injection molding or the like. Moreover, employing a resin material for the tire frame enables the structure of a tire to be simplified compared to a conventional rubber-made tire, and as a result enables a tire weight reduction to be achieved.

In the tire of the invention, the fibers may be organic fibers, inorganic fibers, or a combination of organic fibers and inorganic fibers.

The resin material may contain a single type or a combination of plural types of various fibers selected from organic fibers and inorganic fibers that may be synthetic fibers, natural fibers, and/or recycled fibers.

In the tire of the invention, the fibers may have a length (L) of from 0.1 mm to 10 mm, a diameter (D) of from 5 μm to 30 μm, and a ratio (L/D) of the length (L) to the diameter (D) of 50 or greater.

Setting the dimensions of the fibers within the above range facilitates achieving a high strength resin material, and also enables breakage originating from the fibers to be suppressed.

In the tire of the invention, the content of the fibers in the resin material may be from 1% by mass to 20% by mass with respect to the total mass of the resin material.

Setting the content of the fibers in the above range with respect to the total mass of the resin material facilitates achieving a high strength resin material, and also enables breakage originating from the fibers to be suppressed.

In the tire of the invention, the thermoplastic resin may be at least one selected from the group consisting of a thermoplastic polyurethane-based elastomer, a thermoplastic polyamide-based elastomer, a thermoplastic polyolefin-based elastomer, a thermoplastic polystyrene-based elastomer, and a thermoplastic polyester-based elastomer.

The meaning here of "thermoplastic elastomer" is a thermoplastic resin formed of a copolymer including a polymer constituting a hard segment that is crystalline and has a high melting point or a hard segment that has a high cohesive force, and including a polymer constituting a soft segment that is amorphous and has a low glass transition temperature.

Selecting at least one from the group consisting of a thermoplastic polyurethane-based elastomer, a thermoplastic polyamide-based elastomer, a thermoplastic polyolefin-based elastomer, a thermoplastic polystyrene-based elastomer, and a thermoplastic polyester-based elastomer to employ as the thermoplastic resin contained in the resin material enables a tire frame to be achieved that has excellent elasticity whilst imparting the tire frame with excellent strength. This consequently enables a tire with excellent durability to be achieved, and enables ride quality to be improved when the tire is employed on a car.

As explained above, the tire of the invention has excellent heat resistance.

Explanation follows regarding a resin material used in forming the tire frame of the invention, followed by explanation regarding specific embodiments of the tire of the invention, with reference to the drawings.

Resin Material

The tire of the invention includes a circular tire frame formed of a resin material that includes at least a thermoplastic resin and fibers.

Detailed explanation first follows regarding the thermoplastic resin.

Thermoplastic Resins (Thermoplastic Elastomers Included)

Thermoplastic resins (thermoplastic elastomers included) are polymer compounds that materially soften and flow with increasing temperature, and that adopt a relatively hard and strong state on cooling.

In the present specification, out of these, distinction is made between polymer compounds that materially soften and flow with increasing temperature, that adopt a relatively hard and strong state on cooling, and that have a rubber-like elasticity, considered to be thermoplastic elastomers, and polymer compounds that materially soften and flow with increasing temperature, that adopt a relatively hard and strong state on cooling, but do not have a rubber-like elasticity, considered to be non-elastomer thermoplastic resins.

Examples of thermoplastic resins (thermoplastic elastomers included) include thermoplastic polyolefin-based elastomers (TPO), thermoplastic polystyrene-based elastomers (TPS), thermoplastic polyamide-based elastomers (TPA), thermoplastic polyurethane-based elastomers (TPU), thermoplastic polyester-based elastomers (TPC), and dynamically crosslinking-type thermoplastic elastomers (TPV), as well as non-elastomer thermoplastic polyolefin-based resins, non-elastomer thermoplastic polystyrene-based resins, non-elastomer thermoplastic polyamide-based resins, and non-elastomer thermoplastic polyester-based resins.

Thermoplastic Polyolefin-based Elastomer

Examples of the "thermoplastic polyolefin-based elastomer" include materials with at least a polyolefin constituting a hard segment that is crystalline and has a high melting point, and another polymer (for example the polyolefin or another polyolefin) constituting a soft segment that is amorphous and has a low glass transition temperature. Examples of polyolefins to form the hard segment include polyethylene, polypropylene, isotactic polypropylene, and polybutene.

The thermoplastic polyolefin-based elastomer is also sometimes simply referred to as ThermoPlastic Olefin elastomer ("TPO").

The thermoplastic polyolefin-based elastomer is not particularly limited, and examples include copolymers in which a polyolefin constitutes a hard segment that is crystalline and has a high melting point, and an amorphous polymer constitutes a soft segment that has a low glass transition temperature.

Examples of the thermoplastic polyolefin-based elastomer include olefin-α-olefin random copolymers, and olefin block copolymers, with examples thereof including propylene block copolymers, ethylene-propylene copolymers, propylene-1-hexene copolymers, propylene-4-methyl-1pentene copolymers, propylene-1-butene copolymers, ethylene-1-hexene copolymers, ethylene-4-methyl-pentene copolymers, ethylene-1-butene copolymers, 1-butene-1-hexene copolymers, 1-butene-4-methyl-pentene, ethylene-methacrylic acid copolymers, ethylene-methyl methacrylate copolymers, ethylene-ethyl methacrylate copolymers, ethylene-butyl methacrylate copolymers, ethylene-methyl acrylate copolymers, ethylene-ethyl acrylate copolymers, ethylene-butyl acrylate copolymers, propylene-methacrylic acid copolymers, propylene-methyl methacrylate copolymers, propylene-ethyl methacrylate copolymers, propylene-butyl methacrylate copolymers, propylene-methyl acrylate copolymers, propylene-ethyl acrylate copolymers, propylene-butyl acrylate copolymers, ethylene-vinyl acetate copolymers, and propylene-vinyl acetate copolymers.

Preferable examples of the thermoplastic polyolefin-based elastomer include propylene block copolymers, ethylene-propylene copolymers, propylene-1-hexene copolymers, propylene-4-methyl-1pentene copolymers, propylene-1-butene copolymers, ethylene-1-hexene copolymers, ethylene-4-methyl-pentene copolymers, ethylene-1-butene copolymers, ethylene-methacrylic acid copolymers, ethylene-methyl methacrylate copolymers, ethylene-ethyl methacrylate copolymers, ethylene-butyl methacrylate copolymers, ethylene-methyl acrylate copolymers, ethylene-ethyl acrylate copolymers, ethylene-butyl acrylate copolymers, propylene-methacrylic acid copolymers, propylene-methyl methacrylate copolymers, propylene-ethyl methacrylate copolymers, propylene-butyl methacrylate copolymers, propylene-methyl acrylate copolymers, propylene-ethyl acrylate copolymers, propylene-butyl acrylate copolymers, ethylene-vinyl acetate copolymers, and propylene-vinyl acetate copolymers, and still more preferable examples thereof include ethylene-propylene copolymers, propylene-1-butene copolymers, ethylene-1-butene copolymers, ethylene-methyl methacrylate copolymers, ethylene-methyl acrylate copolymers, ethylene-ethyl acrylate copolymers, and ethylene-butyl acrylate copolymers.

Two or more polyolefin resins, such as ethylene and propylene, may be used in combination. The polyolefin content ratio in the thermoplastic polyolefin-based elastomer is preferably from 50% by mass to 100% by mass.

The number average molecular weight of the thermoplastic polyolefin-based elastomer is preferably from 5,000 to 10,000,000. If the number average molecular weight of the thermoplastic polyolefin-based elastomer is from 5,000 to 10,000,000, the resin material has sufficient mechanical physical properties and excellent workability. From similar viewpoints, the number average molecular weight is more preferably from 7,000 to 1,000,000, and is particularly preferably from 10,000 to 1,000,000. This thereby enables further improvements to the mechanical physical properties and workability of the resin material. From the viewpoints of toughness and low temperature flexibility, the number average molecular weight of the polymer constituting the soft segment is preferably from 200 to 6000. From the viewpoint of formability, the mass ratio (x:y) of the hard segment (x) to the soft segment (y) is preferably from 50:50 to 95:5, and is still more preferably from 50:50 to 90:10.

A thermoplastic polyolefin-based elastomer may be synthesized by copolymerizing a polymer forming the hard segment and a polymer forming the soft segment, described above, using a known method.

The product of acid-modifying a thermoplastic elastomer may also be employed as the thermoplastic elastomer.

The "product of acid-modifying a thermoplastic elastomer" refers to a product of causing an unsaturated compound having an acid group such as a carboxylic acid group, a sulfuric acid group, or a phosphoric acid group, to bond with a thermoplastic elastomer. For example, when an unsaturated carboxylic acid (generally, maleic acid anhydride) is employed as the unsaturated compound having an acid group, an unsaturated bond site of the unsaturated carboxylic acid is caused to bond with (for example, by graft polymerization) a thermoplastic polyolefin-based elastomer.

From the viewpoint of suppressing degradation of a thermoplastic elastomer, the compound having an acid group is preferably a compound having a carboxylic acid group that is a weak acid group, with examples including acrylic acid, methacrylic acid, itaconic acid, crotonic acid, isocrotonic acid, and maleic acid.

Examples of commercial products employable as the thermoplastic polyolefin-based elastomer described above include, for example, products from the "TAFMER" series (for example, A0550S, A1050S, A4050S, A1070S, A4070S, A35070S, A1085S, A4085S, A7090, A70090, MH7007, MH7010, XM-7070, XM-7080, BL4000, BL2481, BL3110, BL3450, P-0275, P-0375, P-0775, P-0180, P-0280, P-0480, and P-0680), manufactured by Mitsui Chemicals, Inc., products from the "NUCREL" series (for example, AN4214C, AN4225C, AN42115C, NO903HC, N0908C, AN42012C, N410, N1050H, N1108C, N1110H, N1207C, N1214, AN4221C, N1525, N1560, NO200H, AN4228C, AN4213C, and N035C) and products from the "ELVALOY AC" series (for example, 1125AC, 1209AC, 1218AC, 1609AC, 1820AC, 1913AC, 2112AC, 2116AC, 2615AC, 2715AC, 3117AC, 3427AC, and 3717AC), manufactured by Du Pont-Mitsui Polychemicals Co., Ltd., products from the "ACRYFT" series and products from the "EVATATE" series, manufactured by Sumitomo Chemical Co., Ltd., and products from the "ULTRA SEN" series, manufactured by Tosoh Corporation.

Examples of commercial products employable as the thermoplastic polyolefin-based elastomer also include, for example, products from the "PRIME TPO" series (examples include, E-2900H, F-3900H, E-2900, F-3900, J-5900, E-2910, F-3910, J-5910, E-2710, F-3710, J-5910, E-2740, F-3740, R110MP, R110E, T310E, and M142E), manufactured by Prime Polymer Co., Ltd.

Thermoplastic Polystyrene-based Elastomer

Examples of the thermoplastic polystyrene-based elastomer include materials with at least polystyrene constituting the hard segment, and with another polymer (for example polybutadiene, polyisoprene, polyethylene, hydrogenated polybutadiene, hydrogenated polyisoprene, or the like) constituting the soft segment with a low glass transition temperature. Synthetic rubbers, such as vulcanized SBR resins or the like, may be used as the thermoplastic polystyrene-based elastomer.

Thermoplastic polystyrene-based elastomers are sometimes referred to as ThermoPlastic Styrene elastomers ("TPS").

Either an acid-modified thermoplastic polystyrene-based elastomer modified with an acid group, or an unmodified thermoplastic polystyrene-based elastomer may be employed as the thermoplastic polystyrene-based elastomer.

Examples of polystyrenes that may be suitably employed for forming the hard segment include, for example, those obtained using known radical polymerization methods, or those obtained using known ionic polymerization methods, for example a polystyrene having an anionic living polymer form. Examples of polymers for forming the soft segment include, for example, polybutadiene, polyisoprene, poly(2, 3-dimethyl-butadiene), and the like. The acid-modified thermoplastic polystyrene-based elastomer may be obtained by acid-modifying an unmodified thermoplastic polystyrene-based elastomer, as described below.

Examples of combinations of the hard segment and the soft segment include combinations of the hard segment and the soft segment described above. Of these, a combination of polystyrene/polybutadiene, or a combination of polystyrene/polyisoprene, is preferable. Moreover, to suppress unintended crosslinking reactions of the thermoplastic elastomer, the soft segment is preferably hydrogenated.

The number average molecular weight of the polymer (polystyrene) constituting the hard segment is preferably from 5000 to 500000, and preferably from 10000 to 200000.

The number average molecular weight of the polymer(s) constituting the soft segment is preferably from 5000 to 1000000, more preferably from 10000 to 800000, and particularly preferably from 30000 to 500000. From the viewpoint of formability, the volume ratio (x:y) of the hard segment (x) to the soft segment (y) is preferably from 5:95 to 80:20, and still more preferably from 10:90 to 70:30.

The thermoplastic polystyrene-based elastomer may be synthesized by copolymerize a polymer forming the hard segment and a polymer forming the soft segment, described above using a known method.

Examples of the thermoplastic polystyrene-based elastomer include styrene-butadiene-based copolymers [SBS (polystyrene-poly(butylene)block-polystyrene), and SEBS (polystyrene-poly(ethylene/butylene)block-polystyrene)], styrene-isoprene copolymers (polystyrene-polyisoprene block-polystyrene), and styrene-propylene-based copolymers [SEP (polystyrene-(ethylene/propylene)block), SEPS (polystyrene-poly(ethylene/propylene)block-polystyrene), SEEPS (polystyrene-poly(ethylene-ethylene/propylene) block-polystyrene)], and SEB (polystyrene (ethylene/butylene)block), and SEBS is particularly preferable.

Examples of commercial products that may be used as the unmodified thermoplastic polystyrene-based elastomer include for example those from the "TUFTEC" series (for example, H1031, H1041, H1043, H1051, H1052, H1053, H1062, H1082, H1141, H1221, or H1272), manufactured by Asahi Kasei Corporation, SEBS (such as "HYBRAR" 5127, or 5125), and SEPS (such as "SEPTON" 2002, 2063, S2004, or S2006), manufactured by Kuraray Co., Ltd.

Acid-modified Thermoplastic Polystyrene-based Elastomer

"Acid-modified thermoplastic polystyrene-based elastomer" refers to a thermoplastic polystyrene-based elastomer that is acid modified by causing an unsaturated compound having an acid group such as a carboxylic acid group, a sulfuric acid group, or a phosphoric acid group to bond with an unmodified thermoplastic polystyrene-based elastomer. The acid-modified thermoplastic polystyrene-based elastomer may be obtained by, for example, causing an unsaturated bond site of an unsaturated carboxylic acid, or an unsaturated carboxylic acid anhydride, to bond (for example, by graft polymerization) with a thermoplastic polystyrene-based elastomer.

From the viewpoint of suppressing degradation of the thermoplastic polyamide-based elastomer, the (unsaturated) compound having an acid group is preferably a compound having a carboxylic acid group that is a weak acid group, and examples that may be employed therefor include acrylic acid, methacrylic acid, itaconic acid, crotonic acid, isocrotonic acid, and maleic acid.

Examples of the acid-modified thermoplastic polystyrene-based elastomer include, for example, TUFTEC such as M1943, M1911, or M1913, manufactured by Asahi Kasei Corporation, and FG19181G, manufactured by Kraton.

The acid value of the acid-modified thermoplastic polystyrene-based elastomer is preferably more than 0 mg (CH$_3$ONa)/g and 20 mg (CH$_3$ONa)/g or less, more preferably more than 0 mg (CH$_3$ONa)/g and 17 mg (CH$_3$ONa)/g or less, and particularly preferably more than 0 mg (CH$_3$ONa)/g and 15 mg (CH$_3$ONa)/g or less.

Thermoplastic Polyamide-based Elastomer

In the invention, "thermoplastic polyamide-based elastomer" refers to a thermoplastic resin material that is formed of a copolymer having a polymer constituting a hard segment that is crystalline and has a high melting point, and a polymer constituting a soft segment that is amorphous and has a low glass transition temperature, wherein the polymer constituting the hard segment has an amide bond (—CONH—) in the main chain thereof.

The thermoplastic polyamide-based elastomer is also sometimes simply referred to as ThermoPlastic Amide elastomer ("TPA").

Examples of the thermoplastic polyamide-based elastomer include materials with at least a crystalline polyamide constituting a hard segment that is crystalline and has a high melting point, and with another polymer (such as, for example, a polyester, or a polyether) that constitutes a soft segment that is amorphous and has a low glass transition temperature. In the thermoplastic polyamide-based elastomer, a chain extender, such as a dicarboxylic acid, may also be employed, as well as the hard segment and the soft segment. Examples of polyamides for forming the hard segment include, for example, polyamides generated from monomers represented by the following Formula (1) or Formula (2).

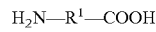

Formula (1)

In Formula (1), R$^1$ represents a hydrocarbon molecular chain having from 2 to 20 carbon atoms, or an alkylene group having from 2 to 20 carbon atoms.

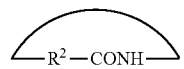

Formula (2)

In Formula (2), R$^2$ represents a hydrocarbon molecular chain having from 3 to 20 carbon atoms, or an alkylene group having from 3 to 20 carbon atoms.

R$^1$ in Formula (1) is preferably a hydrocarbon molecular chain having from 3 to 18 carbon atoms, or an alkylene group having from 3 to 18 carbon atoms, still more preferably a hydrocarbon molecular chain having from 4 to 15 carbon atoms, or an alkylene group having from 4 to 15 carbon atoms, and particularly preferably a hydrocarbon molecular chain having from 10 to 15 carbon atoms, or an alkylene group having from 10 to 15 carbon atoms. R$^2$ in Formula (2) is preferably a hydrocarbon molecular chain having from 3 to 18 carbon atoms, or an alkylene group having from 3 to 18 carbon atoms, is still more preferably a hydrocarbon molecular chain having from 4 to 15 carbon atoms, or an alkylene group having from 4 to 15 carbon atoms, and is particularly preferably a hydrocarbon molecular chain having from 10 to 15 carbon atoms, or an alkylene group having from 10 to 15 carbon atoms.

Examples of the monomers represented by Formula (1) or Formula (2) above include ω-aminocarboxylic acids and lactams. Moreover, examples of the polyamide that forms the hard segment include polycondensates of such ω-aminocarboxylic acid or lactam, and condensation copolymers of diamine and dicarboxylic acid.

Examples that may be employed as the ω-aminocarboxylic acid include aliphatic ω-aminocarboxylic acids having from 5 to 20 carbon atoms, such as 6-aminocaproic acid, 7-aminoheptanoic acid, 8-aminooctanoic acid, 10-aminocapric acid, 11-aminoundecanoic acid, or 12-aminododecanoic acid. Examples that may be employed as the lactam include aliphatic lactams having from 5 to 20 carbon atoms, such as lauryl lactam, ε-caprolactam, undecanolactam, ω-enantholactam, or 2-pyrrolidone.

Examples that may be employed as the diamine include diamine compounds such as aliphatic diamines having from 2 to 20 carbon atoms such as ethylene diamine, trimethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylene diamine, 3-methylpentamethylene diamine, or metaxylenediamine. A dicarboxylic acid may be represented by HOOC—(R$^3$)m-COOH (wherein, R$^3$: a hydrocarbon molecular chain having from 3 to 20 carbon atoms, m: 0 or 1); and examples thereof include an aliphatic dicarboxylic acid having from 2 to 20 carbon atoms such as oxalic acid, succinic acid, glutaric acid, adipic acid, pimelic acid, suberic acid, azelaic acid, sebacic acid, or dodecanedioic acid.

A polyamide formed by ring-opened polycondensation of lauryl lactam, ε-caprolactam or undecanolactam may be preferably employed as the polyamide that forms the hard segment.

Examples of the polymer that forms the soft segment include polyesters and polyethers, with examples thereof including polyethylene glycol, polypropylene glycol, polytetramethylene ether glycol, and ABA-type triblock polyethers. These may be employed singly, or in a combination of two or more thereof. Moreover, a polyether diamine or the like, obtained via a reaction of ammonia or the like with a terminal of a polyether, may be employed.

Herein, "ABA-type triblock polyether" indicates a polyether represented by Formula (3) below.

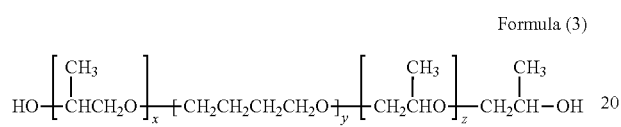

Formula (3)

x and z in Formula (3) represent integers of from 1 to 20. y represents an integer of from 4 to 50.

Each of x and z in Formula (3) is preferably an integer from 1 to 18, more preferably an integer from 1 to 16, and particularly preferably an integer from 1 to 14, and most preferably an integer from 1 to 12 are most preferable. In Formula (3), y is preferably an integer from 5 to 45, more preferably an integer from 6 to 40, particularly preferably an integer of from 7 to 35, and most preferably an integer from 8 to 30.

Examples of combinations of the hard segment and the soft segment include combinations of the hard segment and the soft segment described above. Preferable combinations from among these are a combination of a ring-opened polycondensate of lauryl lactam and polyethylene glycol, a combination of a ring-opened polycondensate of lauryl lactam and polypropylene glycol, a combination of a ring-opened polycondensate of lauryl lactam and polytetramethylene ether glycol, and a combination of a ring-opened polycondensate of lauryl lactam and an ABA-type triblock polyether. The combination of a ring-opened polycondensate of lauryl lactam and an ABA-type triblock polyether is particularly preferable.

From the viewpoint of melt-formability, the number average molecular weight of the polymer (polyamide) constituting the hard segment is preferably from 300 to 30000. From the viewpoints of toughness and low temperature flexibility, the number average molecular weight of the polymer constituting the soft segment is preferably from 200 to 20000. From the viewpoint of formability, the mass ratio (x:y) of the hard segment (x) to the soft segment (y) is preferably from 50:50 to 90:10, and is more preferably from 50:50 to 80:20.

The thermoplastic polyamide-based elastomer may be synthesized by copolymerizing a polymer forming the hard segment and a polymer forming the soft segment described above, using a known method.

Examples of commercial products employable as the thermoplastic polyamide-based elastomer include products from the "UBESTA XPA" series (examples include XPA9063X1, XPA9055X1, XPA9048X2, XPA9048X1, XPA9040X1, XPA9040X2 and XPA9044), manufactured by Ube Industries, Ltd., and products from the "VESTAMID" series (for example, E40-S3, E47-S1, E47-S3, E55-S1, E55-S3, EX9200, and E50-R2), manufactured by Daicel-Evonik Ltd.

Thermoplastic Polyurethane-based Elastomer

Examples of the thermoplastic polyurethane-based elastomer include materials with at least a polyurethane constituting the hard segment that forms pseudo-crosslinks by physical aggregation, and another polymer that constitutes a soft segment that is amorphous and has a low glass transition temperature.

The thermoplastic polyurethane-based elastomer is also referred to as simply ThermoPlastic Urethane elastomer ("TPU").

Specific examples of the thermoplastic polyurethane-based elastomer may include a copolymer including a soft segment including the unit structure represented by the following Structural Unit (U-1), and a hard segment including the unit structure represented by the following Structural Unit (U-2).

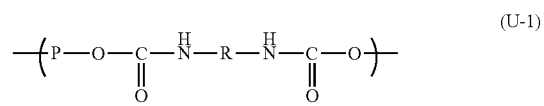

(U-1)

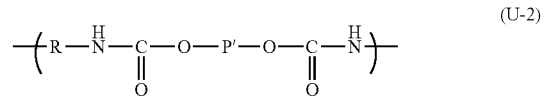

(U-2)

In Structural Unit (U-1) and Structural Unit (U-2), P represents a long-chain aliphatic polyether, or a long-chain aliphatic polyester. R represents an aliphatic hydrocarbon, an alicyclic hydrocarbon, or an aromatic hydrocarbon. P' represents a short-chain aliphatic hydrocarbon, an alicyclic hydrocarbon, or an aromatic hydrocarbon.

In the Structural Unit (U-1), a long-chain aliphatic polyether or long-chain aliphatic polyester with a molecular weight of from 500 to 5000, for example, may be employed as the long-chain aliphatic polyether or the long-chain aliphatic polyester represented by P. P is derived from a diol compound including a long-chain aliphatic polyether, or a long-chain aliphatic polyester, represented by P. Examples of such diol compounds include polyethylene glycols, polypropylene glycols, polytetramethylene ether glycols, poly(butylene adipate) diols, poly-ε-caprolactone diols, poly(hexamethylene carbonate) diols, and ABA-type triblock polyethers (polyethers represented by Formula (3) above), within the molecular weight range described above.

These compounds may be employed singly, or in a combination of two or more thereof.

In Structural Unit (U-1), and Structural Unit (U-2), R is derived from a diisocyanate compound including an aliphatic hydrocarbon, an alicyclic hydrocarbon, or an aromatic hydrocarbon represented by R. Examples of aliphatic diisocyanate compounds including an aliphatic hydrocarbon represented by R include 1,2-ethylene diisocyanate, 1,3-propylene diisocyanate, 1,4-butane diisocyanate, and 1,6-hexamethylene diisocyanate.

Moreover, examples of diisocyanate compounds including an alicyclic hydrocarbon represented by R include 1,4-cyclohexane diisocyanate, and 4,4-cyclohexane diisocyanate. Examples of aromatic diisocyanate compounds including the aromatic hydrocarbon represented by R include 4,4'-diphenylmethane diisocyanate, and tolylene diisocyanate.

These compounds may be employed singly, or in a combination of two or more thereof.

In Structural Unit (U-2), a short-chain aliphatic hydrocarbon, alicyclic hydrocarbon, or aromatic hydrocarbon with a molecular weight of less than 500, for example, may be employed as the short-chain aliphatic hydrocarbon, alicyclic hydrocarbon, or aromatic hydrocarbon represented by P'. P' is derived from a diol compound including a short-chain aliphatic hydrocarbon, alicyclic hydrocarbon, or aromatic hydrocarbon represented by P'. Examples of aliphatic diol compounds including a short-chain aliphatic hydrocarbon represented by P' include glycols, and polyalkylene glycols, with examples thereof including ethylene glycol, propylene glycol, trimethylene glycol, 1,4-butanediol, 1,3-butanediol, 1,5-pentanediol, 1,6-hexanediol, 1,7-heptanediol, 1,8-octanediol, 1,9-nonanediol, and 1,10-decanediol.

Moreover, examples of alicyclic diol compounds including an alicyclic hydrocarbon represented by P' include cyclopentane-1,2-diol, cyclohexane-1,2-diol, cyclohexane-1,3-diol, cyclohexane-1,4-diol, and cyclohexane-1,4-dimethanol.

Furthermore, examples of aromatic diol compounds including an aromatic hydrocarbon represented by P' include hydroquinone, resorcinol, chlorohydroquinone, bromohydroquinone, methylhydroquinone, phenylhydroquinone, methoxyhydroquinone, phenoxyhydroquinone, 4,4'-dihydroxybiphenyl, 4,4'-dihydroxydiphenylether, 4,4'-dihydroxydiphenylsulfide, 4,4'-dihydroxydiphenylsulfone, 4,4'-dihydroxybenzophenone, 4,4'-dihydroxydiphenylmethane, bisphenol A, 1,1-di(4-hydroxyphenyl)cyclohexane, 1,2-bis(4-hydroxyphenoxy)ethane, 1,4-dihydroxynaphthalene, and 2,6-dihydroxynaphthalene.

These compounds may be employed singly, or in a combination of two or more thereof.

From the viewpoint of melt-formability, the number average molecular weight of the polymer (polyurethane) constituting the hard segment is preferably from 300 to 1500. Moreover, from the viewpoints of flexibility and thermal stability of the thermoplastic polyurethane-based elastomer, the number average molecular weight of the polymer constituting the soft segment is preferably from 500 to 20000, more preferably from 500 to 5000, and particularly preferably from 500 to 3000. From the viewpoint of formability, the mass ratio (x:y) of the hard segment (x) to the soft segment (y) is preferably from 15:85 to 90:10, and more preferably from 30:70 to 90:10.

The thermoplastic polyurethane-based elastomer may be synthesized by copolymerizing a polymer forming the hard segment, and a polymer forming the soft segment, described above, by a known method. The thermoplastic polyurethane described in JP-A H05-331256, for example, may be employed as the thermoplastic polyurethane-based elastomer.

Specifically, the thermoplastic polyurethane-based elastomer is preferably a combination of a hard segment consisting of an aromatic diol and an aromatic diisocyanate, and a soft segment consisting of a polycarbonate ester, with a tolylene diisocyanate (TDI)/polyester-based polyol copolymer, a TDI/polyether-based polyol copolymer, a TDI/caprolactone-based polyol copolymer, a TDI/polycarbonate-based polyol copolymer, a 4,4'-diphenylmethane diisocyanate (MDI)/polyester-based polyol copolymer, an MDI/polyether-based polyol copolymer, an MDI/caprolactone-based polyol copolymer, an MDI/polycarbonate-based polyol copolymer, or an MDI+hydroquinone/polyhexamethylene carbonate copolymer being preferable, and a TDI/polyester-based polyol copolymer, a TDI/polyether-based polyol copolymer, an MDI/polyester polyol copolymer, an MDI/polyether-based polyol copolymer, or an MDI+hydroquinone/polyhexamethylene carbonate copolymer being more preferable.

Moreover, examples of commercial products that may be employed as the thermoplastic polyurethane-based elastomer include the "ELASTOLLAN" series (examples include ET680, ET880, ET690, and ET890), manufactured by BASF, the "KURAMIRON U" series (for example, 2000 series, 3000 series, 8000 series, and 9000 series), manufactured by Kuraray Co., Ltd., and the "MIRACTRAN" series (for example, XN-2001, XN-2004, P390RSUP, P480RSUI, P26MRNAT, E490, E590, and P890), manufactured by Nippon Miractran Co., Ltd.

Thermoplastic Polyester-based Elastomer

Examples of the thermoplastic polyester-based elastomer include materials with at least a polyester constituting a hard segment that is crystalline and has a high melting point, and another polymer (such as a polyester or a polyether) configures a soft segment that is amorphous and has a low glass transition temperature.

The thermoplastic polyester-based elastomer is also referred to as ThermoPlastic polyester elastomer ("TPC").

An aromatic polyester may be employed as the polyester that forms the hard segment. The aromatic polyester may be formed of, for example, an aromatic dicarboxylic acid, or an ester-forming derivative thereof, and an aliphatic diol. The aromatic polyester is preferably polybutylene terephthalate derived from terephthalic acid and/or dimethyl terephthalate, and 1,4-butanediol. Moreover, the aromatic polyester may be a polyester derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, or 5-sulfoisophthalic acid, or an ester-forming derivative thereof, and a diol with a molecular weight of 300 or less, for example: an aliphatic diol such as ethylene glycol, trimethylene glycol, pentamethylene glycol, hexamethylene glycol, neopentyl glycol, or decamethylene glycol; an alicyclic diol such as 1,4-cyclohexane dimethanol, or tricyclodecane dimethylol; or an aromatic diol such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl, or 4,4'-dihydroxy-p-quaterphenyl. Moreover, the aromatic polyester may be a copolymer polyester that employs two or more of the above dicarboxylic acid components and diol components in combination. Copolymerization can also be made with a polyfunctional carboxylic acid component, a polyfunctional oxyacid component, a polyfunctional hydroxy component, or the like, having three or more functional groups, in a range of 5% by mol or less.

Examples of polyesters to form the hard segment include polyethylene terephthalate, polybutylene terephthalate, polymethylene terephthalate, polyethylene naphthalate, and polybutylene naphthalate, with polybutylene terephthalate being preferable.

Examples of polymers to form the soft segment include aliphatic polyesters and aliphatic polyethers.

Examples of the aliphatic polyether include poly(ethylene oxide)glycol, poly(propylene oxide)glycol, poly(tetramethylene oxide)glycol, poly(hexamethylene oxide)glycol, a copolymer of ethylene oxide and propylene oxide, an addition polymerized product of poly(propylene oxide)glycol with ethylene oxide, and a copolymer of ethylene oxide and tetrahydrofuran.

Examples of the aliphatic polyester include poly(ε-caprolactone), polyenantholactone, polycaprylolactone, polybutylene adipate, and polyethylene adipate.

Of these aliphatic polyethers and aliphatic polyesters, poly(tetramethylene oxide)glycol, an ethylene oxide adduct of poly(propylene oxide)glycol, poly(ε-caprolactone), polybutylene adipate, polyethylene adipate, or the like is preferable from the viewpoint of the elasticity characteristics of the obtained polyester block copolymer.

From the viewpoints of toughness and flexibility at low temperature, the number average molecular weight of the polymer constituting the soft segment is preferably from 300 to 6000. From the viewpoint of formability, the mass ratio (x:y) of the hard segment (x) to the soft segment (y) is preferably from 99:1 to 20:80, and still more preferably from 98:2 to 30:70.

Examples of combination of hard segment and soft segment may include combinations of the hard segments and the soft segments described above. Of these, a combination in which the hard segment is polybutylene terephthalate and the soft segment is an aliphatic polyether is preferable, and a combination in which the hard segment is polybutylene terephthalate, and the soft segment is poly(ethylene oxide) glycol is still more preferable.

As the thermoplastic polyester-based elastomer, for example, commercial products from the "HYTREL" series (such as, for example, 3046, 5557, 6347, 4047, and 4767), manufactured by Du Pont-Toray Co., Ltd., and from the "PELPRENE" series (such as P30B, P40B, P40H, P55B, P70B, P150B, P280B, P450B, P150M, S1001, S2001, S5001, S6001, and S9001), manufactured by Toyobo Co., Ltd., may be employed.

The above thermoplastic elastomers may be synthesized by copolymerizing a polymer forming the hard segment, and a polymer forming the soft segment, described above, by a known method.

Explanation follows regarding various non-elastomer thermoplastic resins.

Non-elastomer Thermoplastic Polyolefin-based Resin

A non-elastomer polyolefin-based resin is a polyolefin-based resin with a higher elastic modulus than the thermoplastic polyolefin-based elastomers described above.

Examples of the non-elastomer thermoplastic polyolefin-based resin include homopolymers, random copolymers, and block copolymers of α-olefins such as propylene, or ethylene, and of annular olefins such as cycloolefins. Specific examples thereof include thermoplastic polyethylene-based resins, thermoplastic polypropylene-based resins, and thermoplastic polybutadiene-based resins, with thermoplastic polypropylene-based resins in particular being preferable from the viewpoints of heat resistance, and workability.

Specific examples of the non-elastomer thermoplastic polypropylene-based resin include propylene homopolymers, propylene-α-olefin random copolymers, and propylene-α-olefin block copolymers. Examples of such α-olefins include α-olefins having approximately from 3 to 20 carbon atoms, such as propylene, 1-butene, 1-pentene, 3-methyl-1-butene, 1-hexene, 4-methyl-1-pentene, 3-methyl-1-pentene, 1-heptene, 1-octene, 1-decene, 1-dodecene, 1-tetradecene, 1-hexadecene, 1-octadecene, and 1-eicosene.

Non-elastomer Thermoplastic Polystyrene-based Resin

The non-elastomer thermoplastic polystyrene-based resin is a thermoplastic polystyrene-based resin with a higher elastic modulus than the thermoplastic polystyrene-based elastomers described above.

A product obtained by, for example, a known radical polymerization method or ionic polymerization method is preferably used as the thermoplastic polystyrene-based resin, with examples thereof including polystyrene having an anionic living polymer. Examples of the thermoplastic polystyrene-based resin include polymers including styrene molecular skeletons, and copolymers of styrene and acrylonitrile.

Of these, acrylonitrile/butadiene/styrene copolymers, hydrogenated products thereof, blends of an acrylonitrile/styrene copolymer and polybutadiene, and hydrogenated products thereof are preferable. Specific examples of the thermoplastic polystyrene-based resin include polystyrenes (known as PS resins), acrylonitrile/styrene resins (known as AS resins), acrylic-styrene-acrylonitrile resins (known as ASA resins), acrylonitrile/butadiene/styrene resins (known as ABS resins (including blended-forms and copolymer-forms)), hydrogenated products of ABS resins (known as AES resins), and acrylonitrile-chlorinated polyethylene-styrene copolymers (known as ACS resins).

Non-elastomer Thermoplastic Polyamide-based Resin

The non-elastomer polyamide-based resin is a polyamide-based resin with a higher elastic modulus than the thermoplastic polyamide-based elastomer described above.

Examples of the thermoplastic polyamide-based resin include polyamides that constitute the hard segment of the thermoplastic polyamide-based elastomers described above. Examples of the thermoplastic polyamide-based resin include, polyamides (amide 6) that are ring-opened polycondensates of E-caprolactam, polyamides (amide 11) that are ring-opened polycondensates of undecanolactam, polyamides (amide 12) that are ring-opened polycondensates of lauryl lactam, polyamides (amide 66) that are condensates of a diamine and a dibasic acid, and polyamides (amide MX) having meta-xylene diamine as a structural unit.

The amide 6 may be represented by, for example, $\{CO-(CH_2)_5-NH\}_n$ (where n represents the number of repeating units).

The amide 11 may be represented by, for example, $\{CO-(CH_2)_{10}-NH\}_n$ (where n represents the number of repeating units).

The amide 12 may be represented by, for example, $\{CO-(CH_2)_{11}-NH\}_n$ (where n represents the number of repeating units).

The amide 66 may be represented by, for example, $\{CO(CH_2)_4CONH(CH_2)_6NH\}_n$ (where n represents the number of repeating units).

Moreover, the amide MX having meta-xylene diamine as a structural unit may be represented by, for example, the structural unit (A-1) below (where n in (A-1) represents the number of repeating units).

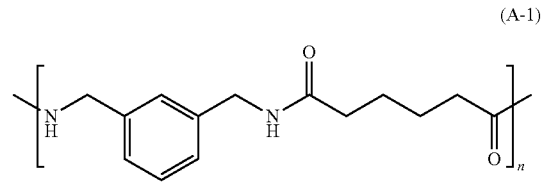

(A-1)

The thermoplastic polyamide-based resin may be a homopolymer configured by only the structural unit, or may be a copolymer of the structural unit (A-1) and another monomer. In the case of a copolymer, the content ratio of the structural unit (A-1) in each thermoplastic polyamide-based resin is preferably 60% by mass or above.

The number average molecular weight of the thermoplastic polyamide-based resin is preferably from 300 to 30000. Moreover, from the viewpoint of toughness and flexibility at low temperature, the number average molecular weight of the polymer constituting the soft segment is preferably from 200 to 20000.

A commercial product may be employed as the non-elastomer polyamide-based resin.

As the amide 6, for example, a commercial product such as "UBE Nylon" 1022B or 1011FB, manufactured by Ube Industries, Ltd., may be used.

As the amide 12, "UBE Nylon" 3024U, manufactured by Ube Industries, Ltd., may for example be used. As the amide 66, "UBE Nylon" 2020B, may be used. Moreover, as the amide MX, for example, a commercial product, such as MX Nylon (S6001, S6021, or S6011), manufactured by Mitsubishi Gas Chemical Company, Inc., may be used.

Non-elastomer Thermoplastic Polyester-based Resin

The non-elastomer polyester-based resin is a resin, having ester bonds in the main chain thereof, with a higher elastic modulus than the thermoplastic polyester-based elastomers described above.

Although the thermoplastic polyester-based resin is not particularly limited, it is preferably the same type of resin as the thermoplastic polyester-based resin included in the hard segment in the thermoplastic polyester-based elastomers described above. Moreover, the non-elastomer polyester-based resin may be crystalline, or amorphous, and examples thereof include aliphatic-type polyesters, and aromatic polyesters. The aliphatic-type polyester may be a saturated aliphatic-type polyester, or an unsaturated aliphatic-type polyester.

Aromatic polyesters are generally crystalline, and may be formed by, for example, an aromatic dicarboxylic acid or an ester forming derivative thereof, and an aliphatic diol.

Examples of the aromatic polyester include polyethylene terephthalate, polybutylene terephthalate, polystyrene terephthalate, polyethylene naphthalate, and polybutylene naphthalate, with polybutylene terephthalate being preferable.

An example of the aromatic polyester is polybutylene terephthalate derived from terephthalic acid and/or dimethyl terephthalate, and 1,4-butanediol. Moreover, the aromatic polyester may be a polyester derived from a dicarboxylic acid component such as isophthalic acid, phthalic acid, naphthalene-2,6-dicarboxylic acid, naphthalene-2,7-dicarboxylic acid, diphenyl-4,4'-dicarboxylic acid, diphenoxyethane dicarboxylic acid, or 5-sulfoisophthalic acid, or an ester-forming derivative thereof, and a diol with a molecular weight of 300 or less (for example, an aliphatic diol such as ethylene glycol, trimethylene glycol, pentamethylene glycol, hexamethylene glycol, neopentyl glycol, or decamethylene glycol, an alicyclic diol such as 1,4-cyclohexane dimethanol, or tricyclodecane dimethylol, or an aromatic diol such as xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl]cyclohexane, 4,4'-dihydroxy-p-terphenyl, or 4,4'-dihydroxy-p-quaterphenyl), and may be a copolymer polyester in which two or more of the above dicarboxylic acid components and diol components are employed in combination. Copolymerization can also be made with a polyfunctional carboxylic acid component having three or more functional groups, a polyfunctional oxyacid component, or a polyfunctional hydroxy component, in a range of 5% or less by mol.

As the aliphatic polyester, any out of a dicarboxylic acid/diol condensate, or a hydroxycarboxylic acid condensate may be employed. Examples thereof include acrylic acid ester resins, methacrylic acid ester resins, polylactic acid esters, polyhydroxy-3-butyl butyric acid esters, polyhydroxy-3-hexylbutyric acid esters, poly($\varepsilon$-caprolactone), polyenantholactone, polycaprylolactone, polybutylene adipate, and polyethylene adipate.

Among the thermoplastic resins listed above, a thermoplastic elastomer is preferable, and out of thermoplastic elastomers, at least one selected from the group consisting of a thermoplastic polyurethane-based elastomer, a thermoplastic polyamide-based elastomer, a thermoplastic polyolefin-based elastomer, a thermoplastic polystyrene-based elastomer, and a thermoplastic polyester-based elastomer is preferable.

The resin material constituted in the tire frame may include, in addition to the thermoplastic resin (thermoplastic elastomers included) described above, a thermosetting resin, to an extend not detrimental to the effects of the invention.

The content of thermoplastic resin in the resin material this being the remaining portion after detecting the total content of fibers, described below, and thermosetting resin and various additives that may be contained if necessary, is preferably from 50% by mass to 95% by mass.

A flame retardant, a pigment, a plasticizer, a stabilizer, an antioxidant, an ultraviolet absorbent, a crosslinking agent, and other additives normally employed as additives may be added to the resin material.

Fibers

The resin material employed in forming the tire frame includes at least one type of fiber.

The fibers may be organic fibers, inorganic fibers, or a combination of organic fibers and inorganic fibers, and the inorganic fibers and the organic fibers may be synthetic fibers, natural fibers, or recycled fibers.

Examples of organic fibers include, for example, aromatic polyamide fibers, aliphatic polyamide fibers, polyester fibers, polyparaphenylene benoxazol fibers, polyvinyl alcohol-based synthetic fibers, polyketone fibers, and carbon fibers.

Examples of inorganic fibers include, for example, carbon fibers and glass fibers.

Examples of recycled fibers include, for example, rayon and cupra.

Examples of natural fibers include, for example, cotton, silk, and wool.

The length (L), the diameter (D), and the ratio of length to diameter (L/D) of the fibers preferably falls within the following ranges.

(1) The length (L) is preferably from 0.1 mm to 10 mm, is more preferably from 0.2 mm to 9 mm, and is still more preferably from 0.3 mm to 9 mm.

The length being 0.1 mm or above enables a reinforcement effect to be achieved, and the length being 10 mm or below enables utilization as pellets in injection molding.

(2) The diameter (D) is preferably from 5 µm to 30 µm, is more preferably from 5 µm to 20 µm, and is still more preferably from 5 µm to 15 µm.

The diameter (D) being 5 µm or above enables a reinforcement effect to be achieved, and the diameter (D) being 30 µm or below or less enables flexibility to be imparted.

(3) The ratio (L/D) of the length and the diameter is preferably 50 or greater, is more preferably 50 to 1000, and is still more preferably from 50 to 500.

Setting the ratio (L/D) of the length and the diameter to 50 or greater enables a reinforcement effect to be achieved.

The length (L), the diameter (D), and the ratio of length to diameter (L/D) of the fibers are each average values taken for 10 individual fibers, and the length (L) and the diameter (D) of the fibers can be measured from images captured of fibers with an optical microscope, or a scanning electron microscope (SEM). In particular for glass fibers, the length and diameter of the fibers may be measured after calcifying at from 500° C. to 700° C. The ratio (L/D) of the length and diameter of the fibers is an average value of values computed from measurement values of length (L) and diameter (D) of the fibers.

From among the above, for the dimensions of the fibers, a combination of length (L), diameter (D), and ratio (L/D) of the length and the diameter is preferably combination of a length (L) of from 0.1 mm to 10 mm, a diameter (D) of from 5 μm to 30 μm, and a ratio (L/D) of the length (L) and the diameter (D) of 50 or greater.

The content of fibers in the resin material is preferably from 1% by mass to 20% by mass with respect to the total mass of the resin material.

The content of fibers being 1% by mass or greater with respect to the total mass of the resin material enables the strength of the resin material to be increased, and the content of fibers being 20% by mass or less enables breaking of the tire frame originating at the fibers to be suppressed.

The content of the fibers in the resin material is preferably from 1% by mass to 20% by mass, is more preferably from 1% by mass to 15% by mass, and is still more preferably from 1% by mass to 10% by mass with respect to the total mass of the resin material.

Surface treatment of the fibers may be performed to improve adhesion between the fibers and the resin material. For example, treatment with a silane coupling agent may be performed for glass fibers, and oxidation treatment and sizing treatment may be performed for carbon fibers.

The fibers of a single substance having a uniform shape may be employed, and fibers of plural substances and various shapes may be employed within the ranges stated above.

An example of a combination of thermoplastic resin and fibers is, for example, a combination in which the thermoplastic resin is at least one selected from the group consisting of a thermoplastic polyamide-based elastomer, and a thermoplastic polyester-based elastomer, and the fibers are at least one selected from the group consisting of glass fibers, carbon fibers, and aliphatic polyamide fibers (for example nylon fibers).

Physical Properties of Resin Material

Explanation next follows regarding preferable physical properties of resin material employed for forming the tire frame.

The melting point (or softening point) of the resin material (tire frame) itself is normally from 100° C. to 350° C., and is preferably from approximately 100° C. to approximately 250° C., and from the viewpoint of tire manufacturability, is preferably from approximately 120° C. to approximately 250° C., and more preferably from 120° C. to 200° C.

By thus employing resin material with a melting point from 120° C. to 250° C., when, for example, forming the frame of the tire by welding together section bodies (frame pieces) thereof, sufficient bonding strength is achieved between the tire frame pieces even for a frame welded in a surrounding temperature range of from 120° C. to 250° C. The tire of the invention accordingly has excellent durability during running, such as puncture resistance performance, abrasion resistance and the like. The heating temperature is preferably a temperature from 10° C. to 150° C. higher, and more preferably a temperature from 10° C. to 100° C. higher, than the melting point (or softening point) of the resin material forming the tire frame pieces.

The tensile elastic modulus, as defined by JIS K7113: 1995, of the resin material (tire frame) itself, is preferably from 100 MPa to 1000 MPa, is more preferably from 100 MPa to 800 MPa, and is particularly preferably from 100 MPa to 700 MPa. The tensile elastic modulus of the resin material being from 100 MPa to 700 MPa enables efficient fitting onto a rim to be performed while maintaining the shape of the tire frame.

The tensile yield strength, as defined by JIS K7113:1995, of the resin material (tire frame) itself is preferably 5 MPa or greater, is preferably from 5 MPa to 20 MPa, and is more preferably from 5 MPa to 17 MPa. The tensile yield strength of the resin material being 5 MPa or greater enables deformation to be withstood for the loads imparted to the tire, such as during running.

The tensile yield elongation, as defined by JIS K7113: 1995, of the resin material (tire frame) itself, is preferably 10% or greater, is preferably from 10% to 70%, and is more preferably from 15% to 60%. The tensile yield elongation of the resin material being 10% or greater enables a large elastic region and good fittability onto a rim to be achieved.

The tensile elongation at break, as defined by JIS K7113: 1995, of the resin material (tire frame) itself is preferably 50% or greater, is preferably 100% or greater, is more preferably 150% or greater, and is particularly preferably 200% or greater. The tensile elongation at break of the resin material being 50% or greater enables good fittability onto a rim to be achieved, and enables low susceptibility to impact damage.

The deflection temperature under load (at 0.45 MPa during loading), as defined by ISO 75-2 or ASTM D648, of the resin material (tire frame) itself, is preferably 50° C. or above, is preferably from 50° C. to 150° C., and is more preferably from 50° C. to 130° C. The deflection temperature under load of the resin material being 50° C. or above enables deformation of the tire frame to be suppressed even in cases in which vulcanization is performed during manufacture of the tire.

First Embodiment

Explanation next follows regarding a tire according to a first embodiment of the tire of the invention, with reference to the drawings.

Figure 1B:
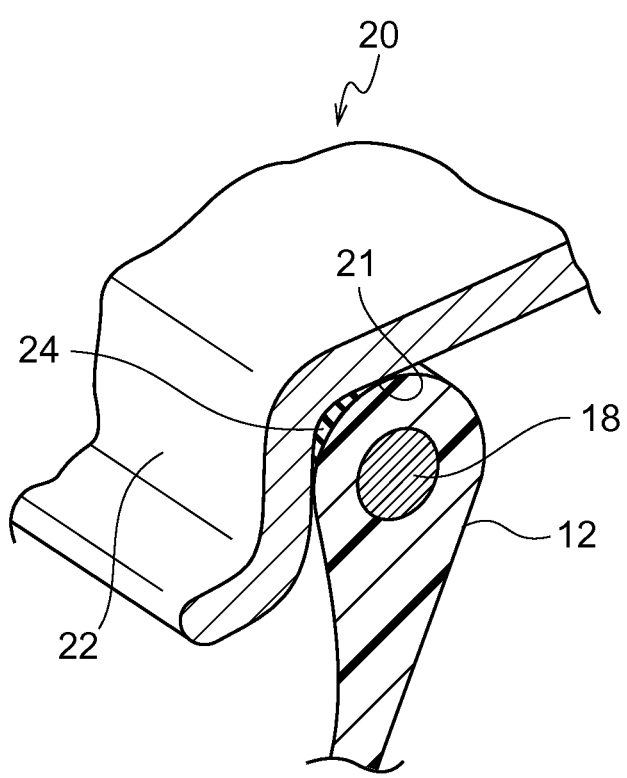
FIG. 1B is a cross-section in the tire of FIG. 1A of a bead portion that has been fitted onto a rim.

Explanation follows regarding a tire 10 of the present embodiment. FIG. 1A is a perspective view illustrating a cross-section of a portion of the tire according to an embodiment of the invention. FIG. 1B is a cross-section of a bead portion fitted to a rim. As illustrated in FIG. 1A, the tire 10 of the present embodiment exhibits a cross-section profile that is substantially the same as an ordinary conventional rubber-made pneumatic tire.

As illustrated in FIG. 1A, the tire 10 is equipped with a tire case 17 (tire frame) configured including a pair of bead portions 12 that each make contact with a bead seat 21 and a rim flange 22 of the rim 20 illustrated in FIG. 1B, side portions 14 that respectively extend from the bead portions 12 toward the tire radial direction outside, and a crown portion 16 (outer circumference portion) that connects together the tire radial direction outside end of one side portion 14 and the tire radial direction outside end of the other side portion 14.

The tire case 17 of the present embodiment is configured by employing a resin material including a thermoplastic polyamide-based elastomer (for example UBESTA, XPA 9040X1, manufactured by Ube Industries, Ltd.) as the thermoplastic resin, and glass fibers (length (L)=3 mm, diameter (D)=9 µm) as the fibers, with the thermoplastic elastomer:fiber mass=97:3.

The tire case 17 of the present embodiment is formed with a single resin material (a thermoplastic polyamide-based elastomer+glass fiber); however, the configuration of the invention is not limited thereto, and similarly to ordinary conventional rubber-made pneumatic tires, resin materials with different characteristics may be employed for each of the sections of the tire case 17 (such as the side portions 14, the crown portion 16 and the bead portions 12). The tire case 17 may be reinforced by a reinforcing material by embedding the reinforcing material (such as fibers, cord, nonwoven fabric, or woven fabric of a polymer material or metal) in the tire case 17 (for example, in the bead portions 12, the side portions 14, the crown portion 16, and the like).

In the tire case 17 of the present embodiment, a pair of tire case half parts (tire frame pieces) 17A formed of the resin material, including the thermoplastic polyamide-based elastomer and the glass fiber, are bonded together. The tire case half parts 17A are each formed as a single body from one of the bead portions 12, one of the side portions 14, and half the width of the crown portion 16, by injection molding or the like, to give tire case half parts 17A of the same annular shape, that are then aligned facing each other and bonded together at tire equatorial plane portions. Note that the tire case 17 is not limited to being formed by bonding two members, and may be formed by bonding three or more members.

The tire case half parts 17A formed with the resin material may, for example, be molded by vacuum molding, pressure molding, injection molding, melt casting, or the like. The need to perform vulcanization is therefore eliminated in contrast to conventional cases in which a tire case is formed of rubber, enabling manufacturing processes to be greatly simplified, and enabling molding time to be reduced.

In the present embodiment, the tire case half parts 17A are formed in left-right symmetrical shapes, namely one of the tire case half parts 17A is formed in the same shape as the other of the tire case half parts 17A, with the advantage that one type of mold suffices for molding the tire case half parts 17A.

In the present embodiment, as illustrated in FIG. 1B, an annular bead core 18, formed of steel cord, is embedded in the bead portions 12, similarly to in ordinary conventional pneumatic tires. However, the invention is not limited to such a configuration, and the bead core 18 may be omitted as long as the rigidity of the bead portions 12 is secured, and there are no issues with fitting onto the rim 20. Other than steel cord, the bead core 18 may also be formed of, for example, organic fiber cord, organic fiber cord covered in a resin, or a hard resin.

In the present embodiment, an annular seal layer 24 (seal portion) formed of a material with more excellent sealing properties than the resin material forming the tire case 17, for example rubber, is formed at portions of the bead portions 12 that contact the rim 20, and at least at portions that contact the rim flanges 22 of the rim 20. The seal layer 24 may also be formed to portions where the tire case 17 (the bead portions 12) and the bead seats 21 contact each other. A softer material than the resin material forming the tire case 17 may be employed as the material with more excellent sealing properties than the resin material forming the tire case 17. As a rubber capable of being employed as the seal layer 24, preferably the same type of rubber is employed as the rubber employed on bead portion external faces of ordinary conventional rubber-made pneumatic tires. The rubber seal layer 24 may also be omitted as long as sealing properties with the rim 20 can be secured with the resin material forming the tire case 17 alone, or another thermoplastic resin (thermoplastic elastomer) with more excellent sealing properties than the resin material may be employed. Examples of such other thermoplastic resins include resins such as polyurethane-based resins, polyolefin-based resins, polystyrene-based resins, polyester resins, and blends of these resins and a rubber or elastomer, or the like. A thermoplastic elastomer may also be employed, and examples include thermoplastic polyester-based elastomers, thermoplastic polyurethane-based elastomers, thermoplastic polystyrene-based elastomers, thermoplastic polyolefin-based elastomers, and blends of a combination of such elastomers with each other, or with rubber, and the like.

As illustrated in FIG. 1A, a reinforcing cord 26 (reinforcing cord member) having higher rigidity than the resin material constituting the tire case 17 is wound onto the crown portion 16 in the tire case 17 circumferential direction. The reinforcing cord 26 is wound in a spiral shape, such that at least a portion thereof is in an embedded state in the crown portion 16 in cross-section taken along the tire case 17 axial direction, to form a reinforcing cord layer 28. A tread 30, formed of a material, for example rubber, having more excellent abrasion resistance than the resin material constituting the tire case 17, is disposed to the tire radial direction outer circumferential side of the reinforcing cord layer 28.

Figure 2:
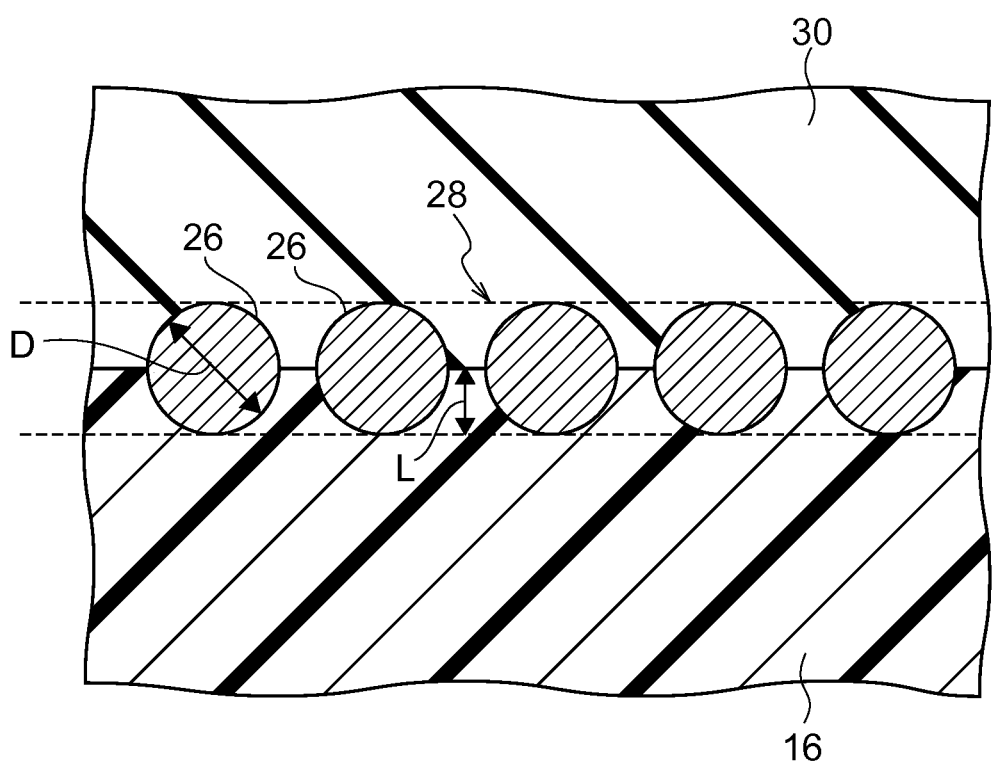
FIG. 2 is a cross-section taken along the tire rotation axis of a tire of a first embodiment, and illustrating a state in which reinforcing cord is embedded in a crown portion of a tire case.

Explanation next follows regarding the reinforcing cord layer 28 formed by the reinforcing cord 26, with reference to FIG. 2. FIG. 2 is a cross-section taken along the tire rotation axis and illustrating a state in which the reinforcing cord is embedded in the crown portion of the tire case of the tire of the first embodiment. As illustrated in FIG. 2, the reinforcing cord 26 is wound in a spiral shape, such that at least a portion thereof is embedded in the crown portion 16 in cross-section taken along the tire case 17 axial direction, so as to form the reinforcing cord layer 28, illustrated, together with a portion of the outer circumference portion of the tire case 17, by the intermittent line portion in FIG. 2. The portion of the reinforcing cord 26 embedded in the crown portion 16 is in a close contact state with the resin material constituting the crown portion 16 (the tire case 17). As the reinforcing cord 26, a monofilament (single strand) such as of metal fiber or organic fiber, or a multifilament (twisted strands) formed of twisted fibers such as a steel cord formed of twisted steel fiber, or the like may be employed. In the present embodiment, a steel cord is employed as the reinforcing cord 26.

The depth L of embedding in FIG. 2 illustrates a depth of embedding of the reinforcing cord 26 with respect to the tire case 17 (the crown portion 16) along the tire rotation axis direction. The depth L of embedding of the reinforcing cord 26 with respect to the crown portion 16 is preferably ⅕ of the diameter D of the reinforcing cord 26, or greater, and more preferably exceeds ½ thereof. It is most preferable for the whole of the reinforcing cord 26 to be embedded in the crown portion 16. From a dimensional perspective of the reinforcing cord 26, if the depth L of embedding of the reinforcing cord 26 exceeds ½ the diameter D of the reinforcing cord 26 then it is difficult for the reinforcing cord 26 to come away from the embedded portion. Embedding the whole of the reinforcing cord 26 in the crown portion 16 gives a flat surface (outer circumferential surface), and enables air to be suppressed from being incorporated at a reinforcing cord circumferential portion even when a member is placed on the crown portion 16 embedded with the reinforcing cord 26. The reinforcing cord layer 28 corresponds to a belt disposed on the outer circumferential surface of a carcass of a conventional rubber-made pneumatic tire.

As described above, the tread 30 is disposed at the tire radial direction outer circumferential side of the reinforcing cord layer 28. The rubber employed in the tread 30 is preferably the same type of rubber as the rubber employed in a conventional rubber-made pneumatic tire. Note that in place of the tread 30, a tread formed of another type of resin material with more excellent abrasion resistance than the resin material forming the tire case 17 may be employed. A tread pattern of plural grooves is formed in the road surface contact face of the tread 30, similarly to in a conventional rubber-made pneumatic tire. Explanation follows regarding a manufacturing method of a tire of the invention.

Tire Case Molding Process

First, tire case half parts supported by a thin metal support ring are aligned facing each other. Then placement is made in a jointing mold, not illustrated in the drawings, such that outer circumferential surfaces of the abutting portions of the tire case half parts make contact. The jointing mold is configured to press the periphery of the bonding section (the abutting portion) of the tire case half parts A with a specific pressure. Then the periphery of the bonding section of the tire case half parts is pressed at the melting point (or softening point) of the resin material forming the tire case or higher. The bonding section of the tire case half parts is heated and pressed by the jointing mold, melting the bonding section, welding the tire case half parts together, and forming these members into a single body of the tire case 17. Note that although in the present embodiment the bonding section of the tire case half parts is heated by using the jointing mold, the invention is not limited thereto, and, for example, the bonding sections may be heated by a separately provided high frequency heater, or the like, or may be pre-softened or melted by using hot air, irradiation with infrared radiation, or the like, and then pressed by the jointing mold. The tire case half parts may thus be bonded together.

Reinforcing Cord Member Winding Process

Figure 3:
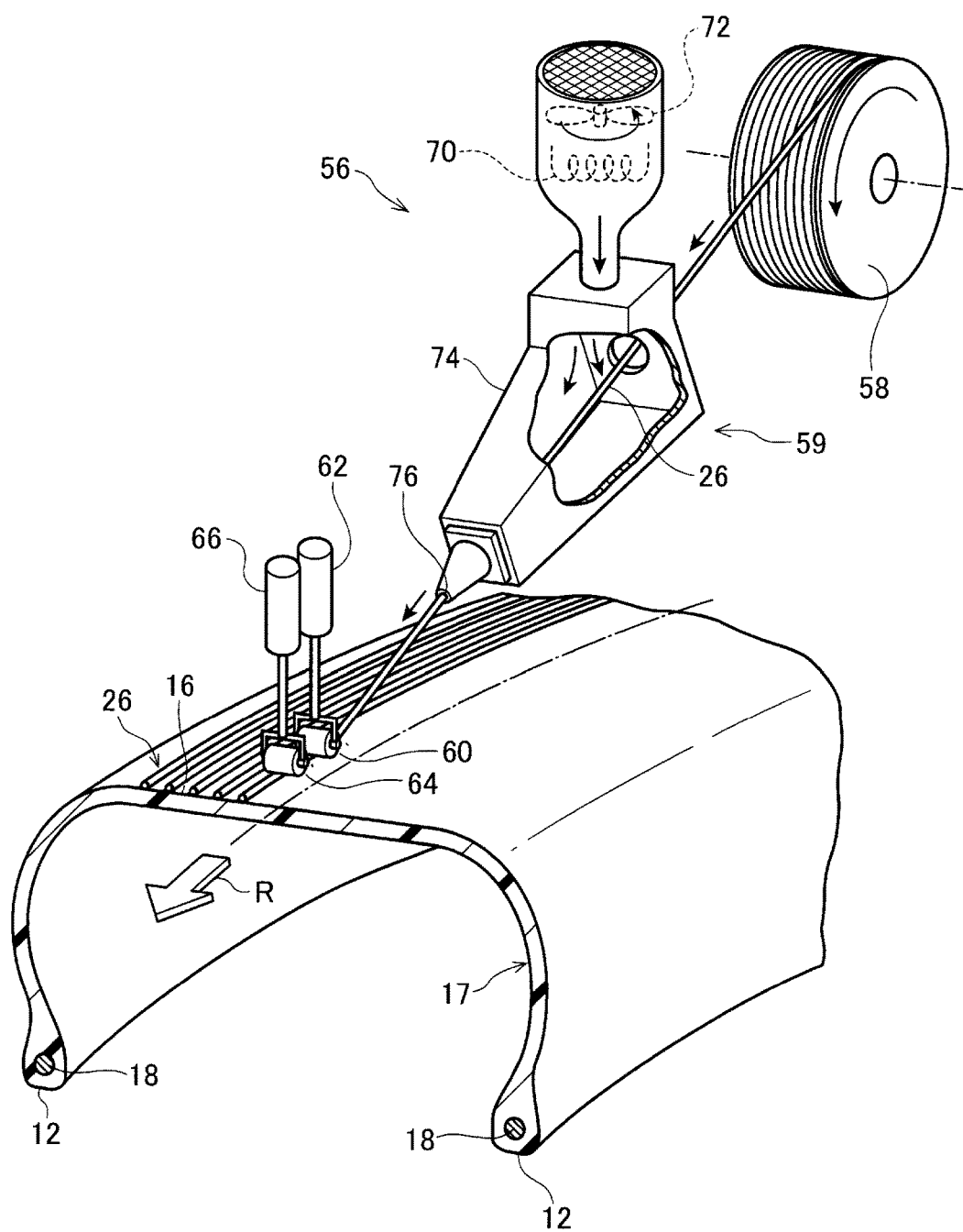
FIG. 3 is an explanatory diagram to explain an operation to embed the reinforcing cord in the crown portion of a tire case using a cord heating device and rollers.

Explanation next follows regarding a reinforcing cord winding process, with reference to FIG. 3. FIG. 3 is an explanatory diagram to explain an operation to embed the reinforcing cord in the crown portion of a tire case, using a cord heating device and rollers. In FIG. 3, a cord feeding apparatus 56 is equipped with: a reel 58 wound with reinforcing cord 26; a cord heating device 59 disposed at the cord conveying direction downstream side of the reel 58; a first roller 60 disposed at the reinforcing cord 26 conveying direction downstream side; a first cylinder device 62 to move the first roller 60 in a direction towards, or away from, the tire outer circumferential surface; a second roller 64 disposed at the reinforcing cord 26 conveying direction downstream side of the first roller 60; and a second cylinder device 66 to move the second roller 64 in a direction towards, or away from, the tire outer circumferential surface. As the second roller 64, a cooling roller made of metal may be employed. In the present embodiment, the surface of the first roller 60 or the second roller 64 is coated with a fluorine resin (TEFLON (registered trademark) in the present embodiment) to suppress adhesion of the melted or softened resin material. Note that in the present embodiment, the cord feeding apparatus 56 is configured with the two rollers, the first roller 60 and the second roller 64; however, the invention is not limited to such a configuration, and may be configured with one of the rollers alone (namely, a single roller).

The cord heating device 59 is equipped with a heater 70 and a fan 72 for generating hot air. The cord heating device 59 is also equipped with a heating box 74 that is supplied inside with hot air and through an interior space of which the reinforcing cord 26 passes, and a discharge outlet 76 that dispenses the heated reinforcing cord 26.

In the present process, first, the temperature of the heater 70 is raised in the cord heating device 59, and the surrounding air heated by the heater 70 is delivered into the heating box 74 by an airflow generated by rotation of the fan 72. The reinforcing cord 26 unwound from the reel 58 is then fed into the heating box 74, of which the internal space has been heated by the hot airflow, and heated (for example, the temperature of the reinforcing cord 26 is heated to from approximately 100° C. to approximately 200° C.). The heated reinforcing cord 26 passes through the discharge outlet 76, and is wound under a constant tension in a spiral shape on the outer circumferential surface of the crown portion 16 of the tire case 17 rotating in the arrow R direction in FIG. 3. When the heated reinforcing cord 26 contacts the outer circumferential surface of the crown portion 16, the resin material of the contact portion melts or softens, and at least a portion of the heated reinforcing cord 26 is embedded in the outer circumferential surface of the crown portion 16. When this is performed, due to the heated reinforcing cord 26 being embedded in the melted or softened resin material, a state is achieved in which there are no gaps between the resin material and the reinforcing cord 26, namely a close contact state. Incorporation of air into the portion where the reinforcing cord 26 is embedded is thereby suppressed. Heating the reinforcing cord 26 to a higher temperature than the melting point (or softening point) of the resin material forming the tire case 17 promotes melting or softening of the resin material at the portion contacted by the reinforcing cord 26. This thereby enables the reinforcing cord 26 to be readily embedded in the outer circumferential surface of the crown portion 16, and enables the incorporation of air to be effectively suppressed.

The depth L of embedding of the reinforcing cord 26 can be adjusted using the heating temperature of the reinforcing cord 26, the tension acting on the reinforcing cord 26, the pressure of the first roller 60, and the like. In the present embodiment, the depth L of embedding of the reinforcing cord 26 is set to be ⅕ of the diameter D of the reinforcing cord 26 or greater. The depth L of embedding of the reinforcing cord 26 more preferably exceeds ½ the diameter D of the reinforcing cord 26, and most preferably the whole of the reinforcing cord 26 is embedded.

The reinforcing cord layer 28 is thus formed at the outer circumferential side of the crown portion 16 of the tire case 17 by winding the heated reinforcing cord 26, while embedding it in the outer circumferential surface of the crown portion 16.

Then the fully vulcanized, belt-shaped, tread 30 is wound a single turn around the outer circumferential surface of the tire case 17, and the tread 30 is bonded to the outer circumferential surface of the tire case 17, with a bonding agent or the like. Note that as the tread 30, for example, a pre-cured tread employed in conventional known recycled tires may be employed. The present process is similar to the process for bonding a pre-cured tread to the outer circumferential surface of a casing of a recycled tire.

Bonding the seal layers 24, formed of a fully vulcanized rubber, to the bead portions 12 of the tire case 17 with a bonding agent or the like thereby completes the tire 10.

Effects

In the tire 10 of the present embodiment, due to the tire case 17 being formed of a resin material respectively including a thermoplastic polyamide-based elastomer as the thermoplastic resin and glass fibers as the fibers, the tire case 17 has excellent strength and excellent pressure withstanding ability. The tire 10 accordingly has excellent durability. The tire 10 has a simpler structure than that of a conventional rubber-made tire, and is hence lighter in weight. The tire 10 of the present embodiment accordingly has high antifriction properties and durability.

In the tire 10 of the present embodiment, the puncture resistance performance, cut resistance performance, and the circumferential direction rigidity of the tire 10 are improved due to winding the reinforcing cord 26, that has a higher rigidity than the resin material, onto the outer circumferential surface of the crown portion 16 of the tire case 17 formed of the resin material, so as to give a spiral shape around the circumferential direction. Raising the circumferential direction rigidity of the tire 10 prevents creep of the tire case 17 formed of the resin material.

Due to at least a portion of the reinforcing cord 26 being embedded in and in close contact with the resin material in the outer circumferential surface of the crown portion 16 of the resin material-formed tire case 17 in a cross-section taken along the axial direction of the tire case 17 (the cross-section illustrated in FIG. 1), incorporation of air during manufacture is suppressed, and the reinforcing cord 26 is suppressed from moving under force input during running, or the like. Delamination or the like of the reinforcing cord 26, the tire case 17, and the tread 30 is thereby suppressed from occurring, improving the durability of the tire 10.

Due to thus enabling the difference in hardness between the tire case 17 and the reinforcing cord layer 28 to be reduced, compared to cases in which the reinforcing cord layer 28 is formed including a resin material, with the reinforcing cord 26 fixed thereto with cushion rubber, the reinforcing cord 26 can be placed in closer contact and better fixed to the tire case 17. This thereby enables the incorporation of air described above to be effectively prevented, enabling movement of the reinforcing cord member during running to be effectively suppressed.

Moreover, cases in which the reinforcing cord 26 is steel cord enable easy separation and recovery from the resin material by heating the reinforcing cord 26 when disposing of the tire, with this being advantageous from the perspective of recycling characteristics of the tire 10. The loss coefficient (tan 6) of resin material is also lower than that of vulcanized rubber, enabling the tire rolling characteristics to be improved when the reinforcing cord layer 28 includes a lot of resin material. Moreover, the in-plane shear stiffness of resin material is larger than that of vulcanized rubber, with the advantages of excellent steering stability and abrasion resistance during tire running.

As illustrated in FIG. 2, the depth L of embedding of the reinforcing cord 26 is 1/5 of the diameter D or greater, and so the incorporation of air during manufacture is effectively suppressed, further suppressing the reinforcing cord 26 from moving under force input during running, or the like.

The tread 30 that contacts the road surface is configured from a rubber material that has greater abrasion resistance than the resin material forming the tire case 17, accordingly improving the abrasion resistance of the tire 10.

Moreover, the annular bead cores 18 formed of a metal material are embedded in the bead portions 12, and so similarly to with a conventional rubber-made pneumatic tire, the tire case 17, namely the tire 10, is firmly retained on the rim 20.

Moreover, the seal layer 24, formed of a rubber material with better sealing properties than the resin material forming the tire case 17, is provided at the portions of the bead portions 12 that contact the rim 20, and so the sealing properties between the tire 10 and the rim 20 are improved. The leakage of air from inside the tire is accordingly even further suppressed than in cases in which a seal is made between the rim 20 and the resin material forming the tire case 17 alone. The fittability onto a rim is therefore improved by providing the seal layer 24.

The above embodiment is configured by heating the reinforcing cord 26, with the surface of the tire case 17 melting or softening at the portions where the heated reinforcing cord 26 makes contact; however, the invention is not limited to such a configuration, and the reinforcing cord 26 may be embedded in the crown portion 16 after using a hot airflow generation device to heat the outer circumferential surface of the crown portion 16 where the reinforcing cord 26 is to be embedded, without heating the reinforcing cord 26.

In the first embodiment, the heat source of the cord heating device 59 is a heater and a fan; however, the invention is not limited to such a configuration, and configuration may be made to directly heat the reinforcing cord 26 with radiation heat (such as, for example, by infrared radiation).

The first embodiment is configured such that the melted or softened portion of the resin material where the reinforcing cord 26 is embedded is force-cooled with the metal second roller 64; however, the invention is not limited to such a configuration, and configuration may be made such that a cooling airflow is blown directly onto the melted or softened portion of the resin material, thereby force-cooling and solidifying the melted or softened portion of the resin material.

The first embodiment is configured such that the reinforcing cord 26 is heated; however, for example, configuration may be made such that the outer periphery of the reinforcing cord 26 is covered in a resin material that is the same as that of the tire case 17. In such cases, by heating the reinforcing cord 26 together with the covering resin material when winding the covered reinforcing cord onto the crown portion 16 of the tire case 17, incorporation of air during embedding in the crown portion 16 can be effectively suppressed.

Winding the reinforcing cord 26 in a spiral shape facilitates manufacture; however, other methods, such as reinforcing cord 26 that is discontinuous in the width direction may also be considered.

In the tire 10 of the first embodiment the bead portions 12 are fitted to the rim 20 so as to form an air chamber between the tire 10 and the rim 20, in what is referred to as a tubeless tire; however, the invention is not limited to such a configuration, and may be formed into a complete tube shape.

Second Embodiment

Figure 4B:
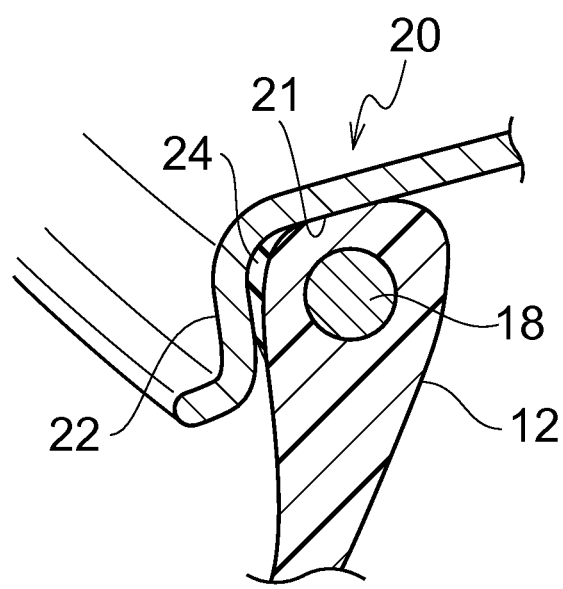
FIG. 4B is an enlarged cross-section taken along the tire width direction of a bead portion of a tire of FIG. 4A, in a fitted state of the tire onto a rim.
Figure 5:
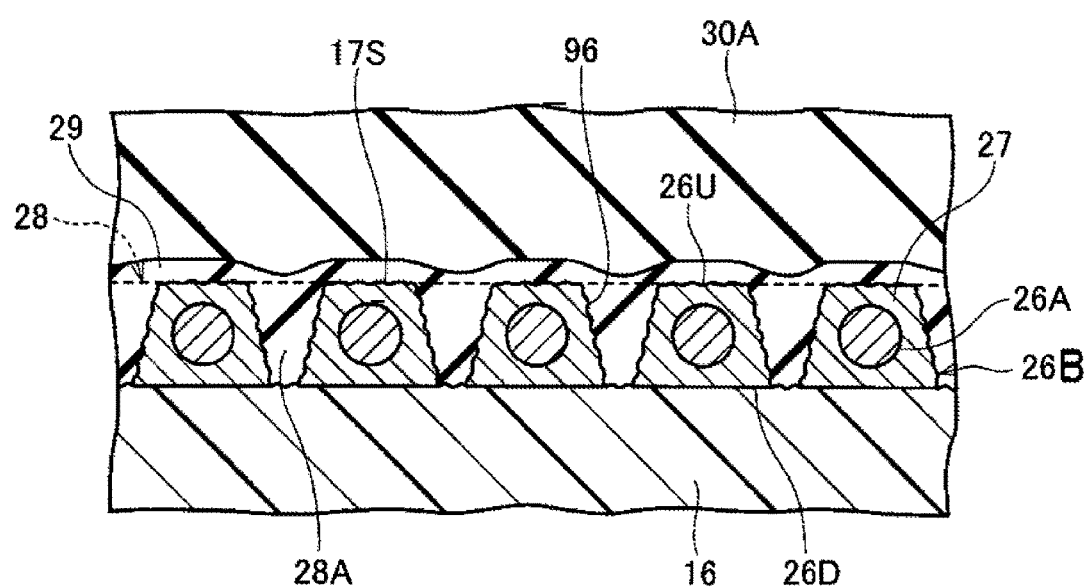
FIG. 5 is a cross-section taken along the tire width direction and illustrating the periphery of a reinforcing layer of a tire according to the second embodiment.

Explanation next follows regarding a second embodiment of a manufacturing method of a tire and tire of the invention, with reference to the drawings. The tire of the present embodiment, similarly to the first embodiment described above, exhibits a cross-section profile that is substantially the same as that of an ordinary conventional rubber-made pneumatic tire. Thus in the following drawings, the same reference numerals are appended to configuration the same as that of the first embodiment. FIG. 4A is a cross-section taken along the tire width direction of the tire of the second embodiment, and FIG. 4B is an enlarged cross-section taken along the tire width direction of a bead portion of a tire of the second embodiment, in a state fitted to a rim. FIG. 5 is a cross-section taken along the tire width direction and illustrates the periphery of a reinforcing layer of a tire according to the second embodiment.

A tire of the second embodiment, similarly to in the first embodiment described above, has a tire case 17 configured employing a resin material including a thermoplastic polyamide-based elastomer (for example UBESTA, XPA 9040X1, manufactured by Ube Industries, Ltd.) as the thermoplastic resin, and glass fibers (length (L)=3 mm, diameter (D)=9 µm) as the fibers, with the thermoplastic elastomer:fiber mass being 97:3.

A tire 200 of the present embodiment, as illustrated in FIG. 4A and FIG. 5, is layered with a reinforcing cord layer 28 (illustrated by the intermittent line in FIG. 5) configured by winding a covered cord member 26B onto the crown portion 16 around the circumferential direction. The reinforcing cord layer 28 forms the outer circumference portion of the tire case 17, and reinforces the circumferential direction rigidity of the crown portion 16. The outer circumferential surface of the reinforcing cord layer 28 is included in an outer circumferential surface 17S of the tire case 17.

The covered cord member 26B is formed with a covering resin material 27, that is a separate body to the resin material forming the tire case 17, covering a cord member 26A (reinforcing cord member) with higher rigidity than the resin material forming the tire case 17. The covered cord member 26B and the crown portion 16 are bonded (for example by welding or by bonding with a bonding agent) at a contacting portion between the covered cord member 26B and the crown portion 16.

The elastic modulus of the covering resin material 27 is preferably set to be within a range of from 0.1 times to 10 times the elastic modulus of the resin material forming the tire case 17. In cases in which the elastic modulus of the covering resin material 27 is 10 times the elastic modulus of the resin material forming the tire case 17 or lower, the crown portion is not too hard, and fitting onto a rim is made easy. In cases in which the elastic modulus of the covering resin material 27 is 0.1 times the elastic modulus of the resin material forming the tire case 17 or greater, the resin constituting the reinforcing cord layer 28 is not too soft, the in-plane shear stiffness of the belt is excellent, and cornering force is improved. In the present embodiment, as the covering resin material 27, a material that is similar to the resin material forming the tire frame is employed.

As illustrated in FIG. 5, the covered cord member 26B is formed with a substantially trapezoidal-shaped cross-section profile. In the following, the reference numeral 26U indicates the top face of the covered cord member 26B (the face on the tire radial direction outside), and the reference numeral 26D indicates the bottom face (the face on the tire radial direction inside). In the present embodiment, the cross-section profile of the covered cord member 26B is configured as a substantially trapezoidal-shaped cross-section profile; however, the invention is not limited thereto, and any shape may be employed other than a shape in which the width of the cross-section profile increases on progression from the bottom face 26D side (the tire radial direction inside) toward the top face 26U side (the tire radial direction outside).

As illustrated in FIG. 5, the covered cord members 26B are disposed running in the circumferential direction at intervals, thereby forming gaps 28A between adjacent covered cord members 26B. The outer circumferential surface of the reinforcing cord layer 28 is accordingly corrugated, and the outer circumferential surface 17S of the tire case 17 constituting the outer circumference of the reinforcing cord layer 28 is also corrugated.

Fine roughened undulations are uniformly formed to the outer circumferential surface 17S of the tire case 17 (including the undulations), and a cushion rubber 29 is bonded thereon with a bonding agent. The rubber portion at the radial direction inside of the cushion rubber 29 flows into the roughened undulations.

A material with more excellent abrasion resistance than the resin material forming the tire case 17, for example the tread 30 formed of rubber, is bonded onto (the outer circumferential surface of) the cushion rubber 29.

For the rubber (tread rubber 30A) employed in the tread 30, preferably the same type of rubber is employed to that employed in conventional rubber-made pneumatic tires. In place of the tread 30, a tread formed of another type of resin material having more excellent abrasion resistance than the resin material forming the tire case 17 may be employed. A tread pattern (not illustrated in the drawings) of plural grooves is formed in the road surface contact face of the tread 30, similarly to in a conventional rubber-made pneumatic tire.

Explanation next follows regarding a manufacturing method of a tire of the present embodiment.

Frame Forming Process First, similarly to in the first embodiment described above, the tire case half parts 17A are formed, and the tire case 17 is then formed by heating and pressing these with a jointing mold.

Reinforcing Cord Member Winding Process

Manufacturing equipment for the tire of the present embodiment is similar to that of the first embodiment described above, with the substantially trapezoidal cross-section shaped covered cord member 26B configured by the cord member 26A covered by the covering resin material 27 (the same resin material as that of the tire case in the present embodiment) wound on the reel 58 in the cord feeding apparatus 56 illustrated in FIG. 3 of the first embodiment.

First, the temperature of the heater 70 is raised, and the surrounding air heated by the heater 70 is delivered into the heating box 74 by an airflow generated by by rotation of the fan 72. The covered cord member 26B unwound from the reel 58 is then fed into the heating box 74 of which the internal space has been heated by the hot airflow, and heated (for example, the temperature of the outer circumferential surface of the covered cord member 26B is heated to the melting point (or softening point) of the covering resin material 27 or above). The covering resin material 27 is rendered into a melted or softened state by heating the covered cord member 26B.

The covered cord member 26B passes through the discharge outlet 76, and is wound in a spiral shape at a constant tension onto the outer circumferential surface of the crown portion 16 of the tire case 17, rotating in the direction towards the nearside of the page. On doing so, the bottom face 26D of the covered cord member 26B contacts the outer circumferential surface of the crown portion 16. The covering resin material 27 in the melted or softened state at the portion making contact then spreads out over the outer circumferential surface of the crown portion 16, and the covered cord member 26B is welded to the outer circumferential surface of the crown portion 16. The bond strength between the crown portion 16 and the covered cord member 26B is thereby raised.

Roughening Treatment Process

Then, using a blasting apparatus, not illustrated in the drawings, projectile material is ejected at high speed at the outer circumferential surface 17S, toward the outer circumferential surface 17S of the tire case 17, while rotating the tire case 17 side. The ejected projectile material impacts the outer circumferential surface 17S, and forms finely roughened undulations 96 with an arithmetic roughness average Ra of 0.05 mm or above on the outer circumferential surface 17S.

Due to forming the finely roughened undulations 96 on the outer circumferential surface 17S of the tire case 17 in this manner, the outer circumferential surface 17S becomes hydrophilic, raising the wetting properties of the bonding agent, described below.

Layering Process

Then a bonding agent is coated onto the outer circumferential surface 17S of the tire case 17 that has been subject to roughening treatment.

As the bonding agent, a triazinethiol-based bonding agent, a chlorinated rubber-based bonding agent, a phenol-based resin bonding agent, an isocyanate-based bonding agent, a halogenated rubber-based bonding agent, a rubber-based bonding agent or the like may be employed without particular limitation; however, the bonding agent preferably reacts at a temperature capable of vulcanizing the cushion rubber 29 (from 90° C. to 140° C.).

One wrap of the non-vulcanized state cushion rubber 29 is then wrapped onto the outer circumferential surface 17S coated with the bonding agent, and then a bonding agent such as a rubber cement composition is coated onto the cushion rubber 29, for example, and one wrap of the tread rubber 30A, in a fully vulcanized or semi-vulcanized state, is wrapped thereon to give a raw tire case state.

Vulcanization Process

The raw tire case is then housed in a vulcanization can and mold, and then vulcanized. At this time, the non-vulcanized cushion rubber 29 flows into the roughened undulations 96 formed to the outer circumferential surface 17S of the tire case 17 by the roughening processing. When vulcanization is complete, an anchor effect is exhibited by the cushion rubber 29 that has flowed into the roughened undulations 96, raising the bond strength between the tire case 17 and the cushion rubber 29. Namely, the bond strength between the tire case 17 and the tread 30 is raised through the cushion rubber 29.

The seal layer 24, formed of a soft material that is softer than the resin material, is bonded to the bead portions 12 of the tire case 17 using a bonding agent or the like, thereby completing the tire 200.

Effects

In the tire 200 of the present embodiment, due to the tire case 17 being formed of a resin material respectively including a thermoplastic polyamide-based elastomer as the thermoplastic resin and glass fibers as the fibers, the tire case 17 has excellent strength and excellent pressure withstanding ability. The tire 200 accordingly has excellent durability. The tire 200 has a simpler structure than that of a conventional rubber-made tire, and is hence lighter in weight. The tire 200 of the present embodiment accordingly has high antifriction properties.

In the manufacturing method of the tire of the present embodiment, when integrating together the tire case 17 with the cushion rubber 29 and the tread rubber 30A, since the outer circumferential surface 17S of the tire case 17 has been subjected roughening treatment, the bondability (adhesiveness) is raised due to an anchor effect. Due to scuffing the resin material forming the tire case 17 by impacting the projectile material, the wetting properties of the bonding agent are raised. The bonding agent is thereby retained in a uniformly coated state on the outer circumferential surface 17S of the tire case 17, enabling the bond strength between the tire case 17 and the cushion rubber 29 to be secured.

In particular, even though undulations are formed in the outer circumferential surface 17S of the tire case 17, roughening treatment is performed to the periphery of the indentations (the indentation walls and indentation bottom) by impacting projectile material into the indentations (the gaps 28A), enabling the bond strength between the tire case 17 and the cushion rubber 29 to be secured.

Moreover, layering the cushion rubber 29 within the region of roughening treatment of the outer circumferential surface 17S of the tire case 17 enables the bond strength between the tire case 17 and the cushion rubber to be effectively secured.

In the vulcanization process, when the cushion rubber 29 is vulcanized, the cushion rubber 29 flows into the roughened undulations formed in the outer circumferential surface 17S of the tire case 17 by roughening treatment. When the vulcanization is complete, the anchor effect is exhibited by the cushion rubber 29 that has flowed into the roughened undulations, raising the bond strength between the tire case 17 and the cushion rubber 29.

The tire 200 manufactured by such a tire manufacturing method secures the bond strength between the tire case 17 and the cushion rubber 29, namely, secures the bond strength between the tire case 17 and the tread 30 through the cushion rubber 29. Delamination between the outer circumferential surface 17S of the tire case 17 of the tire 200 and the cushion rubber 29, for example during running, is accordingly suppressed.

The outer circumference portion of the tire case 17 being constituted by the reinforcing cord layer 28 raises the puncture resistance performance and cut resistance performance in comparison to an outer circumference constituted by something other than the reinforcing cord layer 28.

Forming the reinforcing cord layer 28 by winding the covered cord member 26B raises the circumferential direction rigidity of the tire 200. Raising the circumferential direction rigidity suppresses creep of the tire case 17 (a phenomenon in which there is an increase in plastic deformation of the tire case 17 with time under constant stress), and improves pressure withstanding ability to air pressure from the tire radial direction inside.

When the reinforcing cord layer 28 includes the covered cord member 26B, a smaller difference in hardness between the tire case 17 and the reinforcing cord layer 28 than in cases in which the reinforcing cord 26A (a reinforcing cord member) is simply fixed with the cushion rubber 29 is enabled, thereby enabling even closer contact and better fixing of the covered cord member 26B to the tire case 17. This thereby enables incorporation of air, as described above, to be effectively prevented, enabling movement of the reinforcing cord member during running to be effectively suppressed.

Moreover, cases in which the reinforcing cord 26A is steel cord enable easy separation and recovery from the covered cord member 26B by heating the cord member 26A when disposing of the tire, with this being advantageous from the perspective of recycling characteristics of the tire 200. The loss coefficient (tan δ) of resin material is also lower than that of vulcanized rubber, enabling the tire rolling characteristics to be improved when the reinforcing cord layer 28 includes a lot of resin material. Moreover, the in-plane shear stiffness is larger for resin material than that of vulcanized rubber, with the advantages of excellent steering stability and abrasion resistance during running of the tire.

In the present embodiment, undulations are formed on the outer circumferential surface 17S of the tire case 17; however, the invention is not limited thereto, and the outer circumferential surface 17S may be configured flat.

In the tire case 17, the reinforcing cord layer may be formed by covering a covered cord member, that has been wound and bonded onto the crown portion of a tire case, with a covering thermoplastic material. In such cases, a covering layer may be formed by ejecting the covering thermoplastic material in a melted or softened state onto the reinforcing cord layer 28. Moreover, without employing an extruder, the covering layer may be formed by heating a welding sheet to a melted or softened state, and then attaching to the surface (outer circumferential surface) of the reinforcing cord layer 28.

The second embodiment described above is configured with the tire case 17 formed by bonding case section bodies (the tire case half parts 17A); however, the invention is not limited to such a configuration, and the tire case 17 may be integrally formed, by using a mold or the like.

In the tire 200 of the second embodiment, the bead portions 12 are fitted to the rim 20 so as to form an air chamber between the tire 200 and the rim 20, in what is referred to as a tubeless tire; however, the invention is not limited to such a configuration, and the tire 200 may for example be formed into a complete tube shape.

In the second embodiment, the cushion rubber 29 is disposed between the tire case 17 and the tread 30; however, the invention is not limited thereto, and may be configured without disposing the cushion rubber 29.

The second embodiment is configured with the covered cord member 26B wound in a spiral shape onto the crown portion 16; however, the invention is not limited thereto, and the covered cord member 26B may be wound so as to be discontinuous in the width direction.

In the second embodiment, the covering resin material 27 forming the covered cord member 26B is a thermoplastic material, and configuration is made such that the covering resin material 27 is heated to a melted or softened state and the covered cord member 26B is welded to the outer circumferential surface of the crown portion 16; however, the invention is not limited to such a configuration. Configuration may be made in which, without heating the covering resin material 27, the covered cord member 26B is bonded to the outer circumferential surface of the crown portion 16, by using a bonding agent or the like.

Configuration may be made in which the covering resin material 27 forming the covered cord member 26B is a thermosetting resin, and the covered cord member 26B is bonded to the outer circumferential surface of the crown portion 16 without heating, by using a bonding agent or the like.

Moreover, configuration may be made in which the covering resin material 27 forming the covered cord member 26B is a thermosetting resin, and the tire case 17 is formed with a resin material. In such cases, the covered cord member 26B may be bonded to the outer circumferential surface of the crown portion 16, by a bonding agent or the like, and the portions of the tire case 17 where the covered cord member 26B is disposed is heated to a melted or softened state, so as to weld the covered cord member 26B to the outer circumferential surface of the crown portion 16.

Moreover, configuration may be made in which the covering resin material 27 forming the covered cord member 26B is a thermoplastic material, and the tire case 17 is formed with a resin material. In such cases, the covered cord member 26B may be bonded to the outer circumferential surface of the crown portion 16, by a bonding agent or the like, and the covering resin material 27 heated to a melted or softened state while heating the portions of the tire case 17 where the covered cord member 26B is disposed to a melted or softened state, so as to weld the covered cord member 26B to the outer circumferential surface of the crown portion 16. In cases in which both the tire case 17 and the covered cord member 26B are heated to a melted or softened state, bond strength is improved due to the good mixing between the two members. In cases in which the resin material forming the tire case 17 and the covering resin material 27 forming the covered cord member 26B are both resin materials, they are preferably the same type of thermoplastic material, and are particularly preferably the same thermoplastic material.

The outer circumferential surface 17S of the tire case 17 that has been subjected to roughening treatment may also be subjected to corona treatment, plasma treatment or the like, to activate the surface of the outer circumferential surface 17S and raise the hydrophilic properties before coating with a bonding agent.

Moreover, the sequence for manufacturing the tire 200 is not limited to the sequence of the second embodiment, and may be appropriately modified.

Although embodiments have been explained above as embodiments of the invention, these embodiments are merely examples, and various modifications may be implemented within a range not departing from the spirit of the invention. Obviously the scope of rights of the invention is not limited to these embodiments.

Although embodiments have been explained above as embodiments of the invention, these embodiments are merely examples, and various modifications may be implemented within a range not departing from the spirit of the invention. Obviously the scope of rights of the invention is not limited to these embodiments.

EXAMPLES

More specific explanation regarding the invention is given below based on Examples. However the invention is not limited thereto.

Preparation of Pellets

The respective thermoplastic elastomers, and fibers illustrated in following Table 1 to Table 4 were mixed together, and respective resin materials were kneaded using a twin-screw extruder "LABO PLASTOMILL 50MR" manufactured by Toyo Seiki Seisaku-sho, Ltd. (at a mixing temperature of from 180° C. to 200° C.), whereby pellets were obtained.

Note that in the Comparative Example 1, Comparative Example 2, and Comparative Example 3, pellets of each thermoplastic elastomer were prepared without mixing in fibers.

The results are displayed in Table 1 to Table 4 below.

TABLE 1

|  | Comparative Example 1 | Example 1 | Example 2 | Comparative Example 2 |
|---|---|---|---|---|
| Thermoplastic Elastomer | | | | |
| Thermoplastic Elastomer 1 (Polyamide-based) | 100 | 97 | 95 | 0 |
| Thermoplastic Elastomer 2 (Polyamide-based) | 0 | 0 | 0 | 0 |
| Thermoplastic Elastomer 3 (Polyester-based) | 0 | 0 | 0 | 100 |
| Fibers | | | | |
| Glass fiber 1 | 0 | 3 | 0 | 0 |
| Glass fiber 2 | 0 | 0 | 0 | 0 |
| Glass fiber 3 | 0 | 0 | 0 | 0 |
| Carbon fiber 1 | 0 | 0 | 5 | 0 |
| Carbon fiber 2 | 0 | 0 | 0 | 0 |
| Carbon fiber 3 | 0 | 0 | 0 | 0 |
| Nylon Fiber | 0 | 0 | 0 | 0 |
| Polyester Fiber | 0 | 0 | 0 | 0 |

TABLE 2

|  | Comparative Example 3 | Example 4 | Example 5 | Example 6 | Example 7 |
|---|---|---|---|---|---|
| Thermoplastic Elastomer | | | | | |
| Thermoplastic Elastomer 1 (Polyamide-based) | 0 | 0 | 0 | 0 | 0 |
| Thermoplastic Elastomer 2 (Polyamide-based) | 100 | 97 | 95 | 97 | 95 |
| Thermoplastic Elastomer 3 (Polyester-based) | 0 | 0 | 0 | 0 | 0 |
| Fibers | | | | | |
| Glass fiber 1 | 0 | 3 | 5 | 0 | 0 |
| Glass fiber 2 | 0 | 0 | 0 | 3 | 5 |
| Glass fiber 3 | 0 | 0 | 0 | 0 | 0 |
| Carbon fiber 1 | 0 | 0 | 0 | 0 | 0 |
| Carbon fiber 2 | 0 | 0 | 0 | 0 | 0 |
| Carbon fiber 3 | 0 | 0 | 0 | 0 | 0 |
| Nylon Fiber | 0 | 0 | 0 | 0 | 0 |
| Polyester Fiber | 0 | 0 | 0 | 0 | 0 |

TABLE 3

|  | Example 8 | Example 9 | Example 10 | Example 11 | Example 12 |
|---|---|---|---|---|---|
| Thermoplastic Elastomer | | | | | |
| Thermoplastic Elastomer 1 (Polyamide-based) | 0 | 0 | 0 | 0 | 0 |
| Thermoplastic Elastomer 2 (Polyamide-based) | 97 | 95 | 99 | 97 | 99 |
| Thermoplastic Elastomer 3 (Polyester-based) | 0 | 0 | 0 | 0 | 0 |
| Fibers | | | | | |
| Glass fiber 1 | 0 | 0 | 0 | 0 | 0 |
| Glass fiber 2 | 0 | 0 | 0 | 0 | 0 |
| Glass fiber 3 | 3 | 5 | 0 | 0 | 0 |
| Carbon fiber 1 | 0 | 0 | 0 | 0 | 0 |
| Carbon fiber 2 | 0 | 0 | 1 | 3 | 0 |
| Carbon fiber 3 | 0 | 0 | 0 | 0 | 1 |
| Nylon Fiber | 0 | 0 | 0 | 0 | 0 |
| Polyester Fiber | 0 | 0 | 0 | 0 | 0 |

TABLE 4

|  | Example 13 |
|---|---|
| Thermoplastic Elastomer | |
| Thermoplastic Elastomer 1 (Polyamide-based) | 0 |
| Thermoplastic Elastomer 2 (Polyamide-based) | 95 |
| Thermoplastic Elastomer 3 (Polyester-based) | 0 |
| Fibers | |
| Glass fiber 1 | 0 |
| Glass fiber 2 | 0 |
| Glass fiber 3 | 0 |
| Carbon fiber 1 | 0 |
| Carbon fiber 2 | 0 |
| Carbon fiber 3 | 5 |
| Nylon Fiber | 0 |
| Polyester Fiber | 0 |
| Proportional Change in Pressure Withstanding Ability | 1.8 |

The numerical values shown in the columns for the thermoplastic elastomers and fibers in Table 1 to Table 4 are the content of each of the components in the resin material (% by mass).

The components in Table 1 are the following (1) Thermoplastic Elastomers

Thermoplastic Elastomer 1
polyamide-based (thermoplastic polyamide-based elastomer) UBESTA, XPA9040X1, manufactured by Ube Industries Ltd.

Thermoplastic Elastomer 2
polyamide-based (thermoplastic polyamide-based elastomer) VESTAMID E55-K1W2, manufactured by Daicel-Evonik Ltd.

Thermoplastic Elastomer 3
polyester-based (thermoplastic polyester-based elastomer) HYTREL 4767, manufactured by Du Pont-Toray Co., Ltd.

(2) Fibers

Glass Fiber 1
ECS03-615, manufactured by Central Glass Co., Ltd.
length (L)=3 mm
diameter (D)=9 μm Glass Fiber 2
ECS03-631K, manufactured by Central Glass Co., Ltd.
length (L)=3 mm
diameter (D)=13 μm Glass Fiber 3
ECS03-650, manufactured by Central Glass Co., Ltd.
length (L)=3 mm
diameter (D)=11 μm Carbon Fiber 1
K223SE, manufactured by Mitsubishi Plastics Inc.
length (L)=6 mm
diameter (D)=11 μm Carbon Fiber 2
PYROFIL, TR06NE B4J, manufactured by Mitsubishi Rayon Co., Ltd.
length (L)=6 mm
diameter (D)=7 μm Carbon Fiber 3
PYROFIL, TCTR06203C, manufactured by Mitsubishi Rayon Co., Ltd.
length (L)=6 mm
diameter (D)=7 μm The entire contents of the disclosure of Japanese Patent Application 2012-044646 is incorporated by reference in the present specification.

All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A tire, comprising a circular tire frame formed of a resin material that includes a thermoplastic resin and fibers,
    wherein the content of the fibers in the resin material is from 1% by mass to 10% by mass with respect to the total mass of the resin material, and the fibers have a length (L) of from 5 mm to 10 mm and a diameter (D) of from 7 μm to 30 μm;
    wherein the tire is a pneumatic tire and the tire frame has a pair of bead portions removably contacting a pair of bead seats and a pair of rim flanges when the tire is fitted to a wheel rim, a pair of side portions respectively extending radially outwardly from the bead portions, and a crown portion connecting together the radially outer ends of the pair of side portions, and
    wherein the fibers are aliphatic polyamide fibers.

2. The tire of claim 1, wherein the fibers have a ratio (L/D) of the length (L) to the diameter (D) of from 50 to 1000.

3. The tire of claim 1, wherein the thermoplastic resin is at least one selected from the group consisting of a thermoplastic polyurethane-based elastomer, a thermoplastic polyamide-based elastomer, a thermoplastic polyolefin-based elastomer, a thermoplastic polystyrene-based elastomer, and a thermoplastic polyester-based elastomer.

4. The tire of claim 1, wherein the thermoplastic resin is at least one selected from the group consisting of a thermoplastic polyamide-based elastomer and a thermoplastic polyester-based elastomer.

* * * * *